US012802172B2

(12) United States Patent
Hirakawa et al.

(10) Patent No.: US 12,802,172 B2
(45) Date of Patent: Nov. 17, 2026

(54) INFORMATION PROCESSING METHOD, INFORMATION PROCESSING APPARATUS, INFORMATION PROCESSING PROGRAM, AND INFORMATION PROCESSING SYSTEM

(71) Applicant: FUJIFILM Corporation, Tokyo (JP)

(72) Inventors: Yuya Hirakawa, Saitama (JP); Kazuyoshi Okada, Saitama (JP); Yasunobu Kishine, Saitama (JP); Takashi Kunugise, Saitama (JP); Koichi Tanaka, Saitama (JP); Tatsuro Iwasaki, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 329 days.

(21) Appl. No.: 18/595,461

(22) Filed: Mar. 5, 2024

(65) Prior Publication Data

US 2024/0212107 A1 Jun. 27, 2024

Related U.S. Application Data

(63) Continuation of application No. PCT/JP2022/029055, filed on Jul. 28, 2022.

(30) Foreign Application Priority Data

Sep. 22, 2021 (JP) ................................ 2021-154616

(51) Int. Cl.
*G06T 5/50* (2006.01)
*G02B 5/30* (2006.01)
(Continued)

(52) U.S. Cl.
CPC .................. *G06T 5/50* (2013.01); *G02B 5/30* (2013.01); *G06V 10/141* (2022.01); *H04N 23/55* (2023.01); *G06T 2207/10036* (2013.01)

(58) Field of Classification Search
None
See application file for complete search history.

(56) References Cited

U.S. PATENT DOCUMENTS 9,507,123 B2 11/2016 Yamagata et al.
9,661,193 B2 5/2017 Narumi
(Continued)

FOREIGN PATENT DOCUMENTS

JP 2016036024 3/2016
JP 2021135404 9/2021
(Continued)

OTHER PUBLICATIONS

"International Search Report (Form PCT/ISA/210) of PCT/JP2022/029055," mailed on Sep. 27, 2022, with English translation thereof, pp. 1-5.
(Continued)

*Primary Examiner* — Samah A Beg
(74) *Attorney, Agent, or Firm* — JCIPRNET

(57) ABSTRACT

An embodiment of the present invention provides an information processing method, an information processing apparatus, an information processing program, and an information processing system that can acquire a multispectral image having a good image quality. In an information processing method according to an aspect of the present invention, a processor performs a first parameter acquisition step of acquiring first interference removal parameters to be used for interference removal of the plurality of image signals, an information acquisition step of acquiring first image signals, which are the plurality of image signals corresponding to the plurality of lights, as information indicating wavelength characteristics of a subject via first imaging, and a second parameter acquisition step of acquiring second interference removal parameters to be used for interference removal of second image signals, which are a
(Continued)

plurality of image signals obtained via second imaging, with reference to the information acquired via the first imaging.

12 Claims, 19 Drawing Sheets

(51) Int. Cl.
*G06V 10/141* (2022.01)
*H04N 23/55* (2023.01)

(56) References Cited

U.S. PATENT DOCUMENTS 11,706,506 B2 * 7/2023 Okada .................... G02B 5/20
348/272
11,726,389 B2 * 8/2023 Kawanago ............. G03B 33/16
11,960,200 B2 4/2024 Kawanago et al.
2016/0343114 A1 * 11/2016 Lin .......................... G06T 5/50
2017/0155821 A1 * 6/2017 Ono ...................... G03B 19/07
2022/0078319 A1 * 3/2022 Okada .................... H04N 23/55
2022/0350225 A1 * 11/2022 Kawanago ............ G03B 33/16
2022/0385863 A1 * 12/2022 Kishine ............... G02B 26/008
2024/0242468 A1 * 7/2024 Iwasaki ............... G06V 10/761
2024/0265510 A1 * 8/2024 Tanaka .................. H04N 23/12

FOREIGN PATENT DOCUMENTS

WO 2015004886 1/2015
WO 2021153473 8/2021

OTHER PUBLICATIONS

"Written Opinion of the International Searching Authority (Form PCT/ISA/237) of PCT/JP2022/029055," mailed on Sep. 27, 2022, with English translation thereof, pp. 1-12.

* cited by examiner

INFORMATION PROCESSING METHOD, INFORMATION PROCESSING APPARATUS, INFORMATION PROCESSING PROGRAM, AND INFORMATION PROCESSING SYSTEM

CROSS-REFERENCE TO RELATED APPLICATIONS

The present application is a Continuation of PCT International Application No. PCT/JP2022/029055 filed on Jul. 28, 2022 claiming priority under 35 U.S.C § 119(a) to Japanese Patent Application No. 2021-154616 filed on Sep. 22, 2021. Each of the above applications is hereby expressly incorporated by reference, in its entirety, into the present application.

BACKGROUND OF THE INVENTION

1. Field of the Invention

The present invention relates to an information processing method, an information processing apparatus, an information processing program, and an information processing system that process a multispectral image.

2. Description of the Related Art

With regard to a technique for capturing multispectral images, for example, WO15/004886A and JP2016-36024A disclose that the influence of ghosts is suppressed.

SUMMARY OF THE INVENTION

Embodiments according to a technique of the present disclosure provide an information processing method, an information processing apparatus, an information processing program, and an information processing system that are used to acquire a multispectral image having a good image quality.

An information processing method according to a first aspect of the present invention is an information processing method that is performed by an information processing apparatus including a processor and acquires interference removal parameters for a pupil split type multispectral camera. The pupil split type multispectral camera includes a plurality of aperture regions that are disposed at a pupil position or near a pupil, a plurality of optical filters that are disposed in the plurality of aperture regions and transmit a plurality of lights of which at least a part of wavelength ranges are different from each other, and an image sensor that outputs a plurality of image signals corresponding to the plurality of lights. The processor is configured to perform a first parameter acquisition step of acquiring first interference removal parameters to be used for interference removal of the plurality of image signals, an information acquisition step of acquiring first image signals, which are the plurality of image signals corresponding to the plurality of lights, as information indicating wavelength characteristics of a subject via first imaging, and a second parameter acquisition step of acquiring second interference removal parameters to be used for interference removal of second image signals, which are a plurality of image signals obtained via second imaging, with reference to the information acquired via the first imaging, and the processor is configured to acquire the second interference removal parameters, which allow a difference between the information acquired via the first imaging and the second image signals from which interference is removed using the second interference removal parameters to be smaller than a difference between the information acquired via the first imaging and the second image signals from which interference is removed using the first interference removal parameters, in the second parameter acquisition step.

According to a second aspect, in the information processing method according to the first aspect, the first imaging is preliminary imaging and the second imaging is main imaging, and a focusing position of the first imaging is equivalent to a focusing position of the second imaging.

According to a third aspect, in the information processing method according to the first or second aspect, the processor is configured to acquire a wavelength intensity of the subject in a state where light is not transmitted through a part of the plurality of aperture regions, in the information acquisition step.

According to a fourth aspect, in the information processing method according to any one of the first to third aspects, the processor is configured to acquire the first image signals, which are output in a case where a subject of which wavelength characteristics are already known is imaged in a state where a part of the plurality of aperture regions are shielded and a rest of the aperture regions are open, as the information, in the information acquisition step.

According to a fifth aspect, in the information processing method according to the fourth aspect, the processor is configured to acquire the first image signals as the information in a state where a light shielding member not transmitting light is disposed in the part of the aperture regions to physically shield the part of the aperture regions, in the information acquisition step.

According to a sixth aspect, in the information processing method according to the fourth aspect, the pupil split type multispectral camera includes a plurality of first polarizing members that are disposed in the plurality of aperture regions and transmit lights having different polarization angles, and the processor is configured to acquire the first image signals as the information in a state where second polarizing members having polarization angles orthogonal to polarization angles of the first polarizing members disposed in the part of the aperture regions are disposed in the part of the aperture regions to optically shield the part of the aperture regions, in the information acquisition step.

According to a seventh aspect, in the information processing method according to the fourth aspect, the processor is configured to acquire the first image signals by imaging the subject of which wavelength characteristics are already known in a state where an optical filter transmitting one of the plurality of lights and not transmitting a rest of the lights is disposed close to the subject than the plurality of optical filters, in the information acquisition step.

According to an eighth aspect, in the information processing method according to any one of the first to third aspects, the processor is configured to: acquire the information about a subject of which wavelength characteristics are unknown as first information by imaging the subject in a state where the plurality of optical filters are not disposed in the plurality of aperture regions and an optical filter transmitting one of the plurality of lights and not transmitting a rest of the lights is disposed close to the subject than the plurality of optical filters, and acquire the information about the subject of which wavelength characteristics are unknown as second information by imaging the subject in a state where the plurality of optical filters are disposed in the plurality of aperture regions and an optical filter transmitting one of the plurality of lights and not transmitting a rest of the lights is disposed close to the subject than the plurality of optical filters, in the information acquisition step; and acquire parameters, which are used to correct the second information, as the second interference removal parameters on the basis of the first information, in the second parameter acquisition step.

According to a ninth aspect, in the information processing method according to any one of the first to eighth aspects, the pupil split type multispectral camera includes a plurality of first polarizing members that are disposed in the plurality of aperture regions and transmit lights having different polarization angles, and a plurality of second polarizing members that are disposed on the image sensor and transmit lights having polarization angles corresponding to polarization angles of the plurality of first polarizing members; and the processor is configured to acquire a plurality of image signals corresponding to the polarization angles of the plurality of first polarizing members as the information, in the information acquisition step.

An information processing apparatus according to a tenth aspect of the present invention is an information processing apparatus that acquires interference removal parameters for a pupil split type multispectral camera including a plurality of aperture regions disposed at a pupil position or near a pupil, a plurality of optical filters disposed in the plurality of aperture regions and transmitting a plurality of lights of which at least a part of wavelength ranges are different from each other, and an image sensor outputting a plurality of image signals corresponding to the plurality of lights. The information processing apparatus comprises a processor. The processor is configured to perform first parameter acquisition processing of acquiring first interference removal parameters to be used for interference removal of the plurality of image signals, information acquisition processing of acquiring the plurality of image signals corresponding to the plurality of lights as information indicating wavelength characteristics of a subject via first imaging, and second parameter acquisition processing of acquiring second interference removal parameters to be used for interference removal of second image signals, which are a plurality of image signals obtained via second imaging, with reference to the information acquired via the first imaging, and the processor is configured to acquire the second interference removal parameters, which allow a difference between the information acquired via the first imaging and the second image signals from which interference is removed using the second interference removal parameters to be smaller than a difference between the information acquired via the first imaging and the second image signals from which interference is removed using the first interference removal parameters, in the second parameter acquisition processing.

An information processing program according to an eleventh aspect of the present invention is an information processing program causing an information processing apparatus, which includes a processor, to perform an information processing method of acquiring interference removal parameters for a pupil split type multispectral camera including a plurality of aperture regions that are disposed at a pupil position or near a pupil, a plurality of optical filters that are disposed in the plurality of aperture regions and transmit a plurality of lights of which at least a part of wavelength ranges are different from each other, and an image sensor that outputs a plurality of image signals corresponding to the plurality of lights. The processor is caused to perform a first parameter acquisition step of acquiring first interference removal parameters to be used for interference removal of the plurality of image signals, an information acquisition step of acquiring the plurality of image signals corresponding to the plurality of lights as information indicating wavelength characteristics of a subject via first imaging, and a second parameter acquisition step of acquiring second interference removal parameters to be used for interference removal of second image signals, which are a plurality of image signals obtained via second imaging, with reference to the information acquired via the first imaging. The processor is caused to acquire the second interference removal parameters, which allow a difference between the information acquired via the first imaging and the second image signals from which interference is removed using the second interference removal parameters to be smaller than a difference between the information acquired via the first imaging and the second image signals from which interference is removed using the first interference removal parameters, in the second parameter acquisition step.

An information processing system according to a twelfth aspect of the present invention comprises a pupil split type multispectral camera including a plurality of aperture regions that are disposed at a pupil position or near a pupil, a plurality of optical filters that are disposed in the plurality of aperture regions and transmit a plurality of lights of which at least a part of wavelength ranges are different from each other, and an image sensor that outputs a plurality of image signals corresponding to the plurality of lights; and the information processing apparatus according to the tenth aspect.

According to a thirteenth aspect, in the information processing system according to the twelfth aspect, the processor is configured to: remove interference from the plurality of image signals using the interference removal parameters; and cause an output device to output the plurality of image signals from which the interference has been removed.

DESCRIPTION OF THE PREFERRED EMBODIMENTS

<Interference Removal of Multispectral Camera>

An imaging device using a polarizer is known as an imaging device that captures a multispectral image. In such an imaging device, mixed wavelength information is acquired by the respective polarizing pixels (polarization directions correspond to, for example, 0 deg, 45 deg, 90 deg, and 135 deg), and interference removal (calculation using an inverse matrix) is performed on the basis of mixing ratios thereof. As a result, images corresponding to the respective wavelengths are generated. However, in a case where interference removal is performed using an interference removal matrix that is calculated theoretically, a multispectral image cannot be correctly generated due to a difference (for example, a change in polarization degree caused by refraction or a difference in a ghost and/or a flare) between a development environment and an actual environment (an environment in which imaging, image processing, and the like are actually performed using the imaging device). The interference removal of each pixel is performed by way of example in the present embodiment, but the present invention can be applied to various situations, such as a situation in which interference removal is performed only in a pixel or a region significantly affected by interference.

Under such circumstances, the inventors of the present invention have made a diligent study and have conceived an information processing method, an information processing apparatus, an information processing program, and an information processing system that can acquire a multispectral image having a good image quality. Some embodiments of the present invention will be described below with reference to the accompanying drawings.

First Embodiment

[Schematic Configuration of Imaging System]

Figure 1:
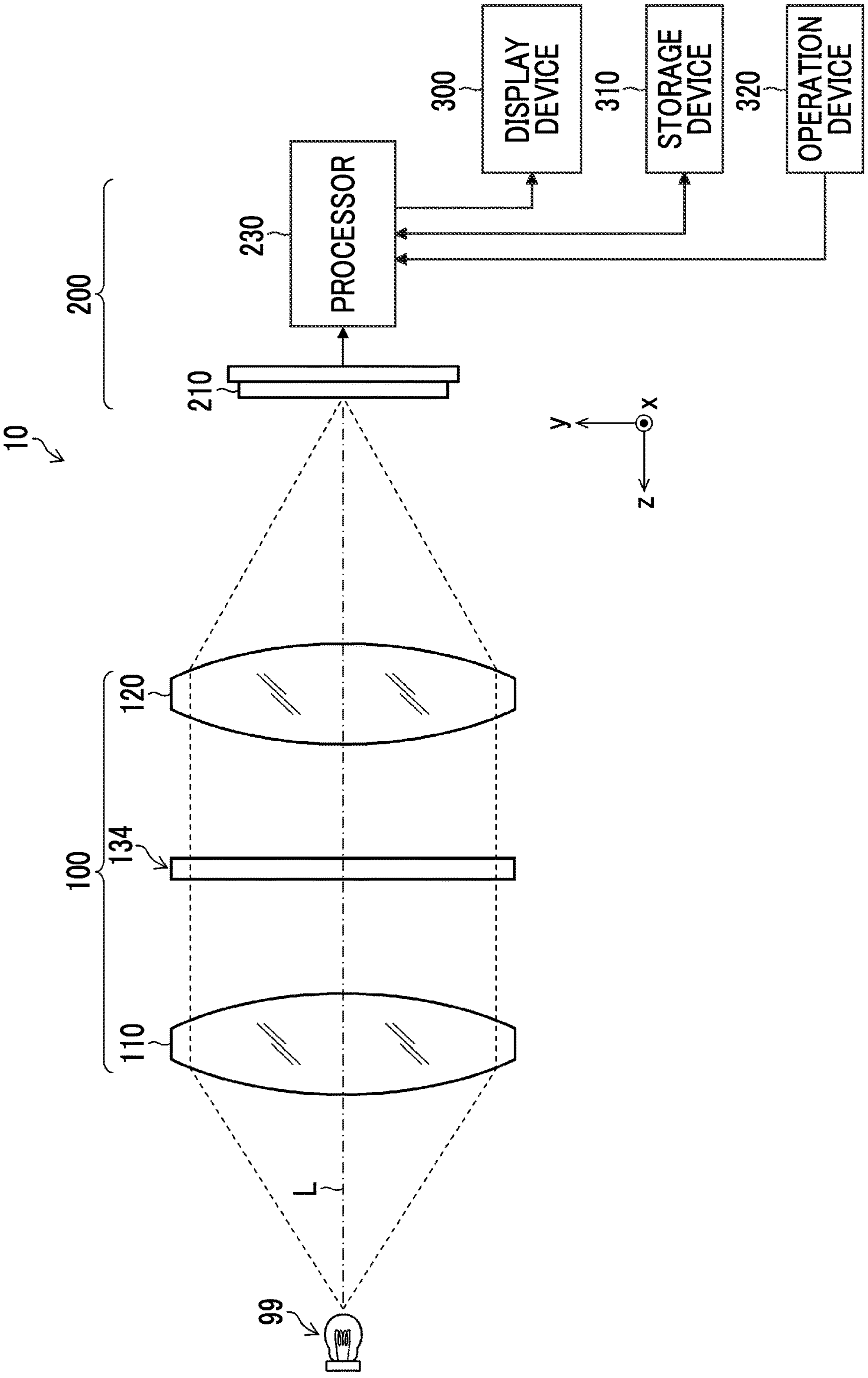
FIG. 1 is a diagram showing a schematic configuration of an imaging system 10 according to a first embodiment.

FIG. 1 is a diagram showing a schematic configuration of an imaging system 10 (an imaging system, an imaging device, an information processing system, and an information processing apparatus) according to a first embodiment. The imaging system 10 includes a lens device 100 (a pupil split type multispectral camera), an imaging device body 200 (a pupil split type multispectral camera), a display device 300 (a liquid crystal display or the like), a storage device 310 (a magneto-optical recording device, a semiconductor memory, or the like), and an operation device 320 (a keyboard, a mouse, a button, a switch, a dial, or the like), and can image a light source 99 (subject) to acquire multispectral images. The configuration of each part will be described in detail below. The imaging system 10 can calculate interference removal parameters based on the acquired multispectral images and can perform interference removal using the calculated interference removal parameters.

[Configuration of Lens Device]

Figure 2:
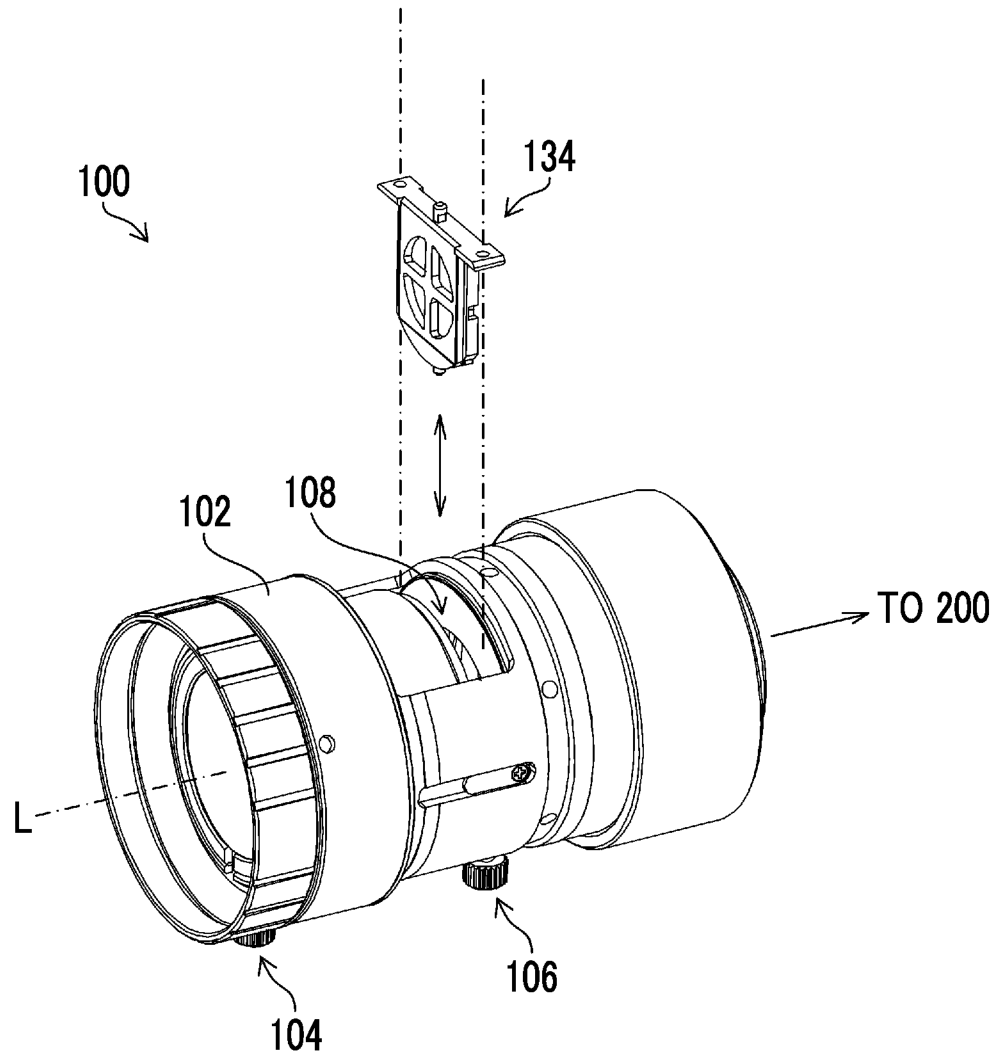
FIG. 2 is a perspective view showing of a configuration of a lens device.
Figure 3:
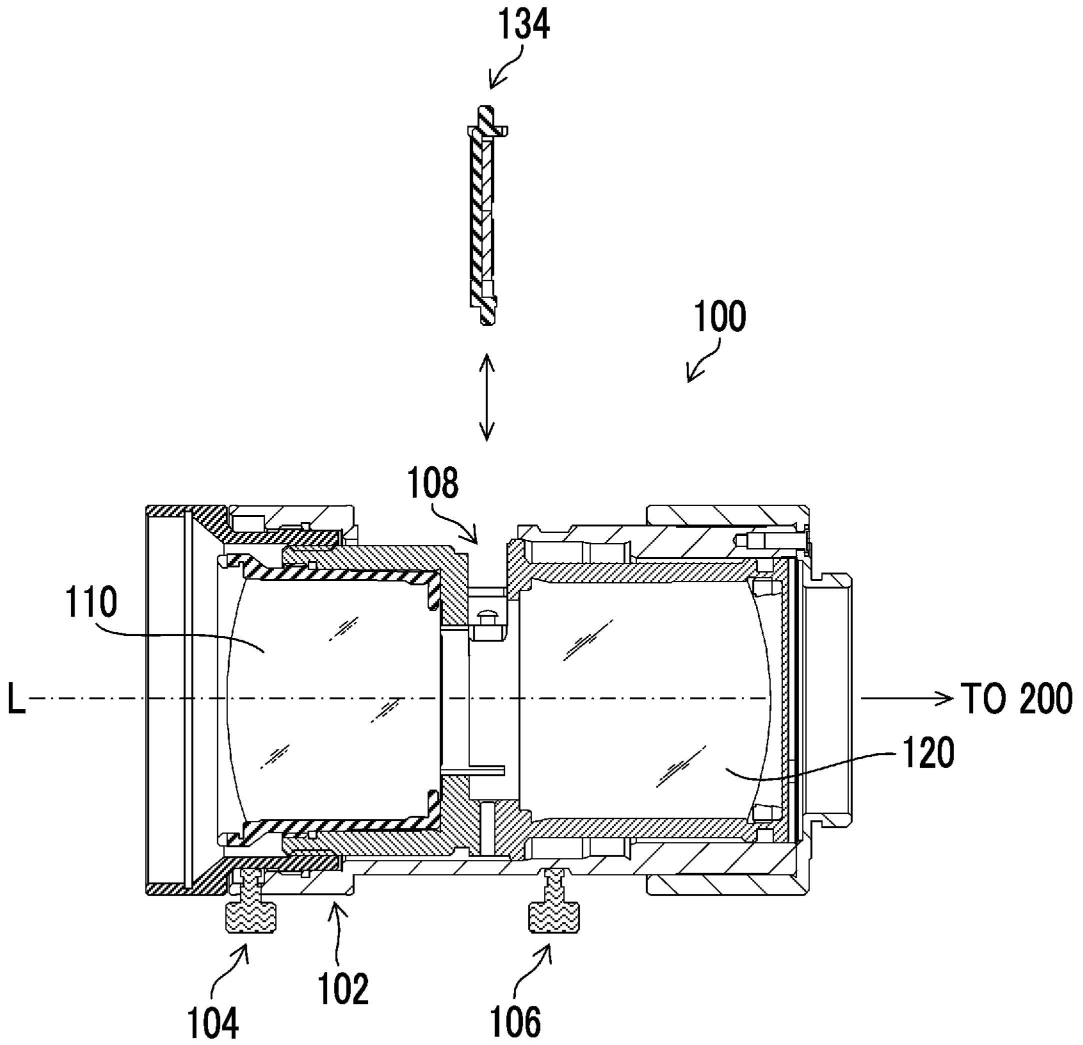
FIG. 3 is a cross-sectional view showing the configuration of the lens device.
Figure 4B:
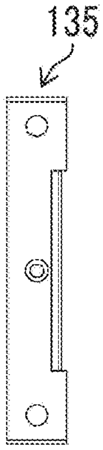
FIGS. 4A, 4B, 4C, 4D, 4E, and 4F are external views showing an example of a filter unit.
Figure 4E:
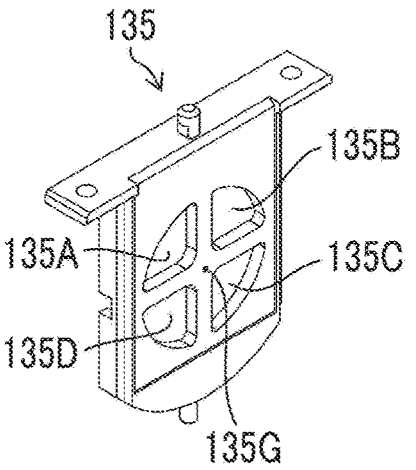
Figure 4A:
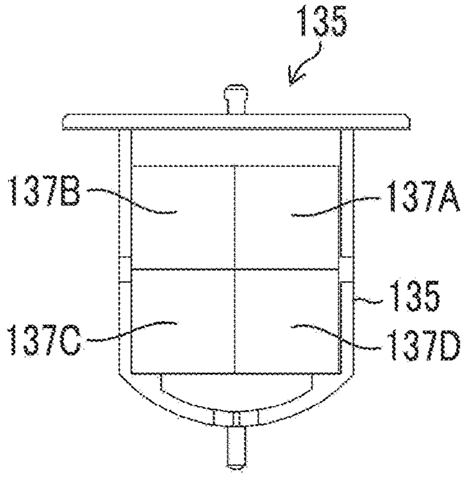
Figure 4C:
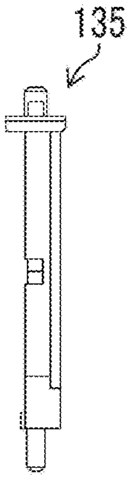
Figure 4F:
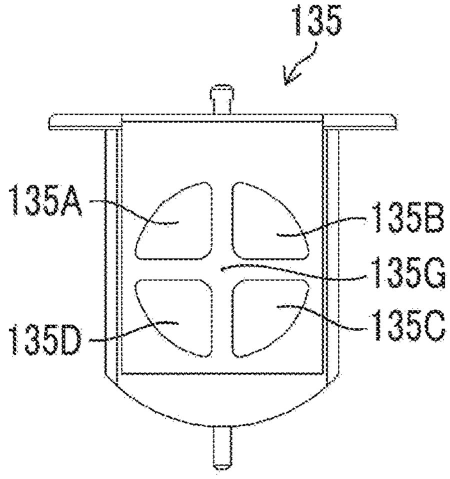
Figure 4D:
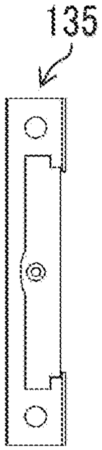

FIG. 2 is a perspective view showing the configuration of the lens device 100, and FIG. 3 is a cross-sectional view showing the configuration of the lens device 100. As shown in FIGS. 2 and 3, an optical system including a first lens 110 and a second lens 120 is disposed in a lens barrel 102 of the lens device 100 and these lenses are moved forward or backward in the direction of an optical axis L in a case where a first lever 104 and a second lever 106 are rotationally moved, so that a focal length and/or an image magnification is adjusted. Each of the first lens 110 and the second lens 120 may be a lens group composed of a plurality of lenses.

Further, a slit 108 is formed in the lens barrel 102 at a pupil position of the lens device 100 or near a pupil, and a filter unit 134 is inserted into the slit 108 and is disposed in a state where an optical axis of the filter unit 134 coincides with the optical axis L of the optical system (the first lens 110, the second lens 120).

[Configuration of Filter Unit]

FIGS. 4A, 4B, 4C, 4D, 4E, and 4F are external views showing an example of the filter unit 134. The filter unit 134 comprises a frame 135, and four aperture regions (aperture regions 135A to 135D; a plurality of aperture regions) are formed in the frame 135. The centroid of these aperture regions 135A to 135D is a centroid 135G. Filter sets 137 (filter sets 137A to 137D; a plurality of optical filters, a plurality of first) can be disposed in the aperture regions 135A to 135D. The configuration of the filter set 137 will be described later.

Figure 5A:
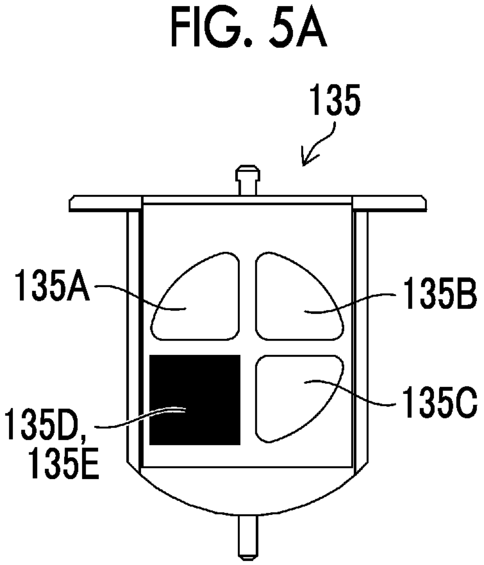
FIGS. 5A and 5B are external views showing another example of the filter unit.
Figure 5B:
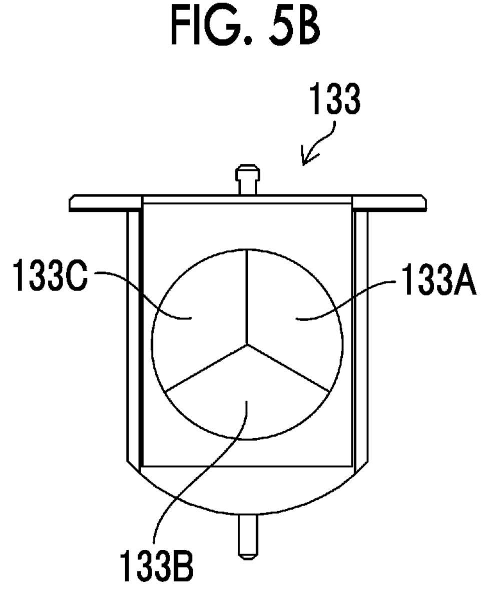

FIGS. 5A and 5B are external views showing another example of the frame (filter unit). As shown in FIGS. 5A and 5B, some aperture regions may be shielded depending on the number of images to be acquired, or frames of which the numbers of aperture regions are different from each other may be used. For example, in a case where images corresponding to three aperture regions are to be acquired, any one aperture region (here, the aperture region 135D) may be shielded by a light shielding member 135E as shown in FIG. 5A or a frame 133 including three aperture regions 133A to 133C may be used as shown in FIG. 5B.

[Configuration of Filter Set]

Figure 6:
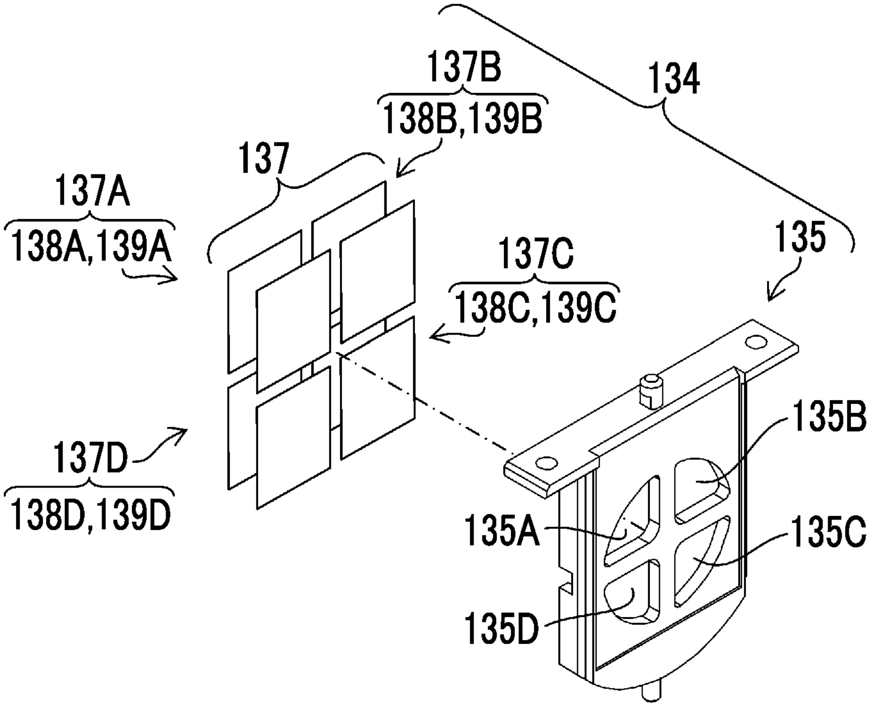
FIG. 6 is a diagram showing an aspect in which filter sets are disposed on a frame.
Figure 7A:
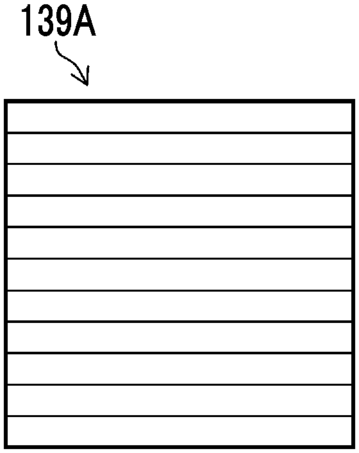
FIGS. 7A, 7B, 7C, and 7D are diagrams showing polarization directions of polarizing filters.
Figure 7B:
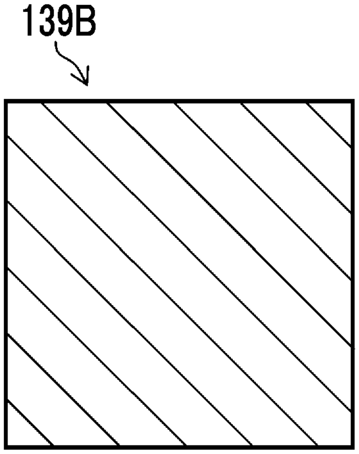
Figure 7C:
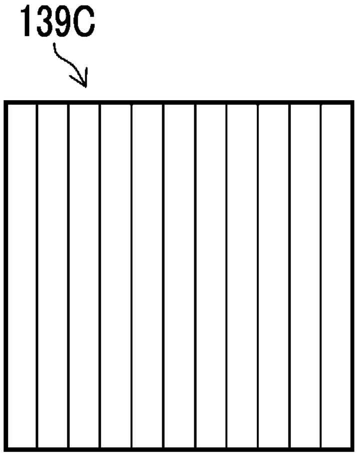
Figure 7D:
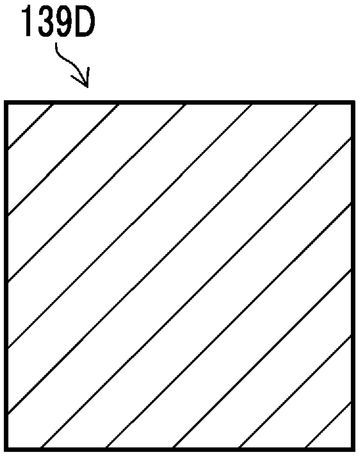

FIG. 6 is a diagram showing an aspect in which the filter sets are disposed on the frame. In an example shown in FIG. 6, the filter sets 137 (filter sets 137A to 137D) include color filters and polarizing filters and are disposed in the aperture regions 135A to 135D, respectively. Specifically, the filter set 137A includes a color filter 138A and a polarizing filter 139A, the filter set 137B includes a color filter 138B and a polarizing filter 139B, the filter set 137C includes a color filter 138C and a polarizing filter 139C, and the filter set 137D includes a color filter 138D and a polarizing filter 139D.

It is preferable that the color filters 138A to 138D are a plurality of optical filters transmitting a plurality of lights of which at least a part of wavelength ranges are different from each other. Further, it is preferable that the polarizing filters 139A to 139D (first polarizing members) are polarizing filters transmitting lights having different polarization angles.

FIGS. 7A, 7B, 7C, and 7D are diagrams showing polarization directions of the polarizing filters 139A to 139D. As shown in FIGS. 7A, 7B, 7C, and 7D, the polarization directions of the polarizing filters 139A to 139D correspond to 0 deg, 45 deg, 90 deg, and 135 deg, respectively. In the present invention, the first polarizing member may be a filter that polarizes light using a polarizing film or may be a filter that polarizes light using wire grids or a plurality of slits.

[Configuration of Image Sensor]

Figure 8:
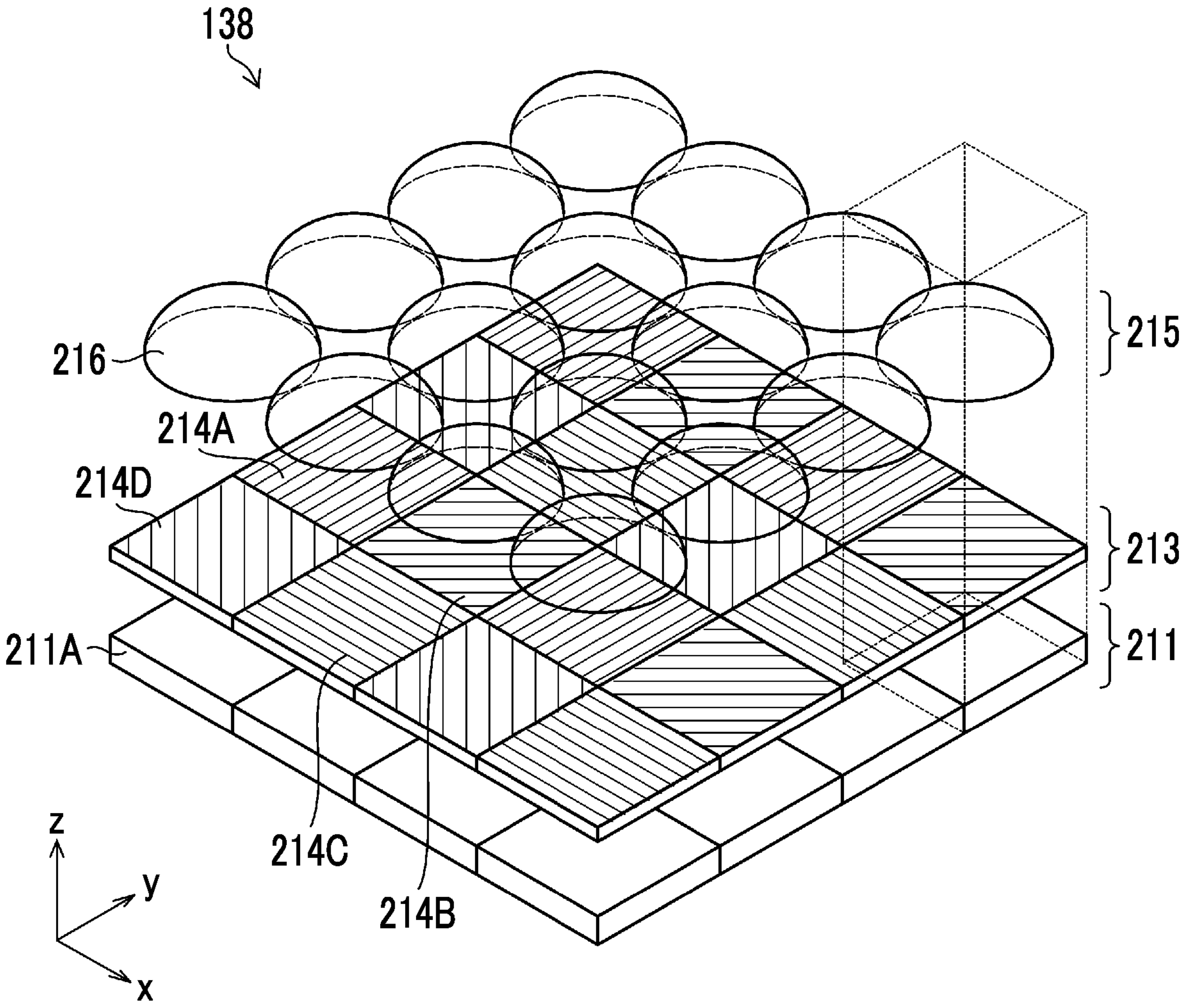
FIG. 8 is a diagram showing a configuration of an image sensor.

An image sensor 138 is a complementary metal-oxide semiconductor (CMOS) image sensor (imaging element) and outputs a plurality of image signals corresponding to a plurality of lights transmitted through the color filters 138A to 138D. As shown in FIG. 8, the image sensor 138 is a monochrome imaging element that includes a pixel array layer 211, a polarizing filter element-array layer 213, and a microlens array layer 215. The respective layers are arranged in order of the pixel array layer 211, the polarizing filter element-array layer 213, and the microlens array layer 215 from an image plane side toward an object side. The image sensor 138 is not limited to a CMOS image sensor and may be an XY address image sensor or a charge coupled device (CCD) image sensor.

The pixel array layer 211 has a configuration in which a lot of photodiodes 211A (a plurality of pixel groups) are two-dimensionally arranged. One photodiode 211A forms one pixel. The respective photodiodes 211A are regularly arranged in a horizontal direction (x direction) and a vertical direction (y direction).

The polarizing filter element-array layer 213 has a configuration in which four types of polarizing filter elements 214A, 214B, 214C, and 214D having different polarization directions (the polarization directions of lights to be transmitted) are two-dimensionally arranged. The polarization directions of the polarizing filter elements 214A, 214B, 214C, and 214D can be set to, for example, 0°, 45°, 90°, and 135°. Further, these polarization directions can be made to correspond to the polarization directions of the polarizing filters 139A to 139D of the above-mentioned filter unit 134 (see FIGS. 7A, 7B, 7C, and 7D). Due to these polarizing filter elements 214A to 214D, the image sensor 138 includes a plurality of image groups that receive any of the lights transmitted through the plurality of aperture regions. These polarizing filter elements 214A and 214D are arranged at the same intervals as the photodiodes 211A, and are provided for pixels, respectively.

The microlens array layer 215 comprises microlenses 216 that are arranged for the respective pixels.

The image sensor 138 comprises an analog amplifier, an analog-to-digital (A/D) converter, and an imaging element driver (not shown).

[Configuration of Processor]

Figure 9:
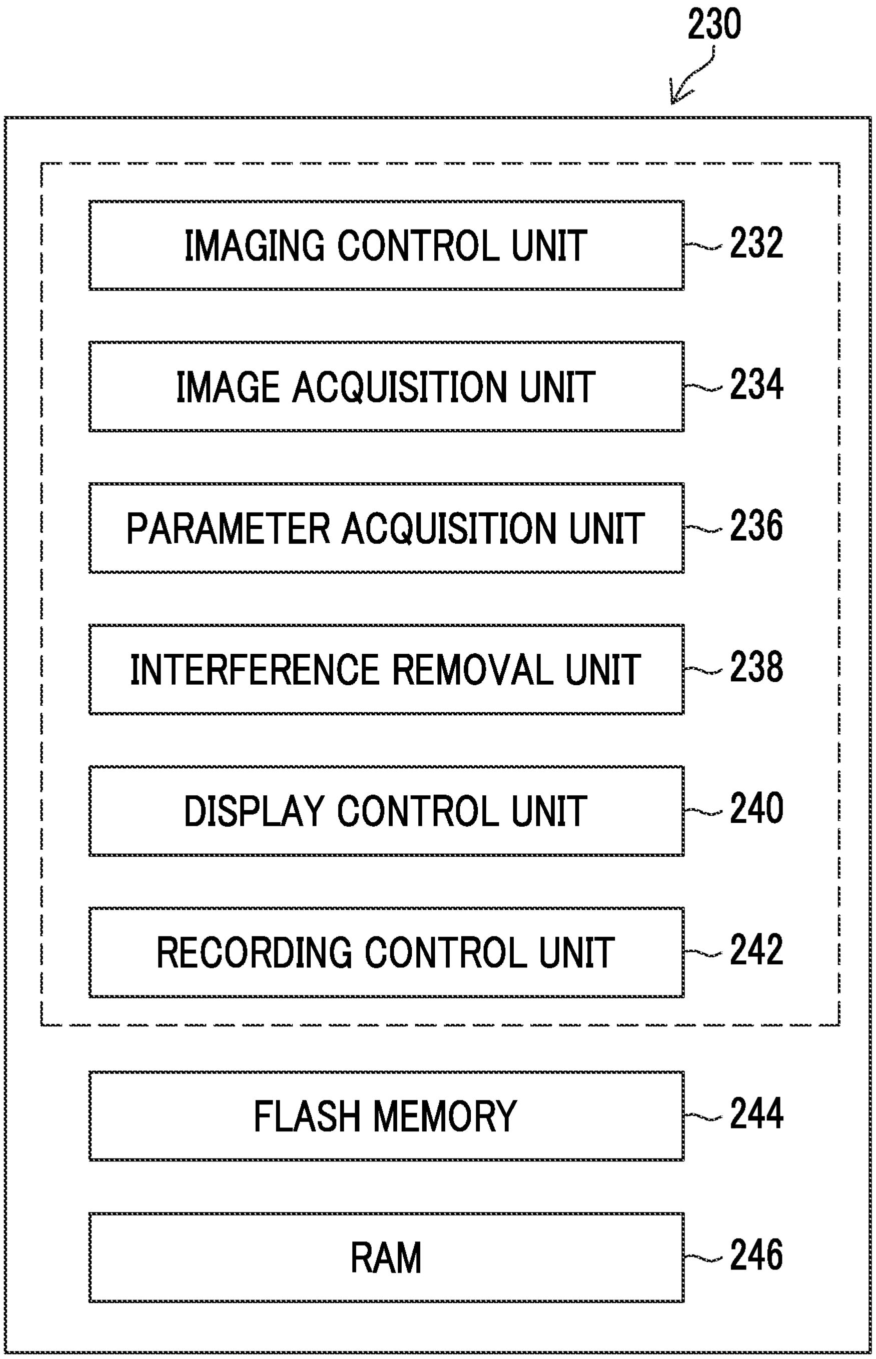
FIG. 9 is a diagram showing a functional configuration of a processor.

FIG. 9 is a diagram showing a configuration of a processor 230 (processor). As shown in FIG. 9, the processor 230 comprises an imaging control unit 232, an image acquisition unit 234, a parameter acquisition unit 236, an interference removal unit 238, a display control unit 240, and a recording control unit 242, and performs an information acquisition step (information acquisition processing) of acquiring a plurality of image signals, a parameter acquisition step (parameter acquisition processing) of acquiring interference removal parameters, an interference removal step (interference removal processing) of removing interference, and the like as described in detail later.

The functions of the above-mentioned processor 230 can be realized using various processors. The various processors include, for example, a central processing unit (CPU) that is a general-purpose processor realizing various functions by executing software (program). Further, the various processors described above include a graphics processing unit (GPU) that is a processor specialized in image processing. Furthermore, the various processors described above also include a programmable logic device (PLD) that is a processor of which circuit configuration can be changed after manufacture, such as a field programmable gate array (FPGA). In addition, the various processors described above also include dedicated electrical circuitry that is a processor having circuit configuration dedicatedly designed to perform specific processing, such as an application specific integrated circuit (ASIC).

The respective functions of the processor 230 may be realized by one processor, or may be realized by a plurality of processors. Further, one processor may correspond to a plurality of functions. Furthermore, the respective functions of the processor 230 may be realized by a circuit, or some of the respective functions may be realized by a circuit and the rest thereof may be realized by a processor.

In a case where the above-mentioned processor or the above-mentioned electrical circuitry executes software (program), processor (computer)-readable codes of the software to be executed or data required to execute the software are stored on a non-transitory recording medium, such as a flash memory 244, and the processor refers to the software or the data. The software stored on the non-transitory recording medium includes an adjustment program that is used to execute an adjustment method according to the present embodiment. The codes or the data may be recorded on non-transitory recording mediums using various magneto-optical recording devices, semiconductor memories, or the like instead of the flash memory 244. Here, "semiconductor memories" include a read only memory (ROM) and an electronically erasable and programmable ROM (EEPROM) in addition to a flash memory. For example, a RAM 246 is used as a transitory storage region during processing using software.

[Acquisition of Interference Removal Parameter]

The acquisition of interference removal parameters (an information processing method, the execution of an information processing program) performed by the imaging system 10 (information processing apparatus) having the above-mentioned configuration will be described below. A case where images are acquired in three wavelength ranges using three aperture regions 135A to 135C and interference removal parameters are acquired on the basis of these images will be described in the following description (in the following aspect, the aperture region 135D is always shielded and is not used for the acquisition of interference removal parameters).

Separately from the acquisition of interference removal parameters (second interference removal parameters) according to each of the following aspects, the parameter acquisition unit 236 (processor) acquires interference removal parameters (first interference removal parameters) to be used for the interference removal of a plurality of image signals, which are obtained via imaging in a state where noises and the like of an actual environment, such as a development environment, are not considered on the basis of the plurality of image signals (a first parameter acquisition step, first parameter acquisition processing).

[First Aspect]

In a first aspect, a subject of which the wavelength characteristics are already known is imaged (preliminary imaging, first imaging) in a state where some (two) aperture regions of three aperture regions 135A to 135C (a plurality of aperture regions) are physically shielded and the rest (one) of the aperture regions is open. Imaging is repeated with a change in an aperture to be opened to acquire images, and interference removal parameters are acquired on the basis of the images. The focusing position of the preliminary imaging (first imaging) is equivalent to the focusing position of main imaging (actual imaging; second imaging). Here, the fact that the focusing position is "equivalent" includes not only a case where the focusing position is completely the same but also a case where there is a deviation to the extent that an influence on interference removal is allowable.

Figure 10A:
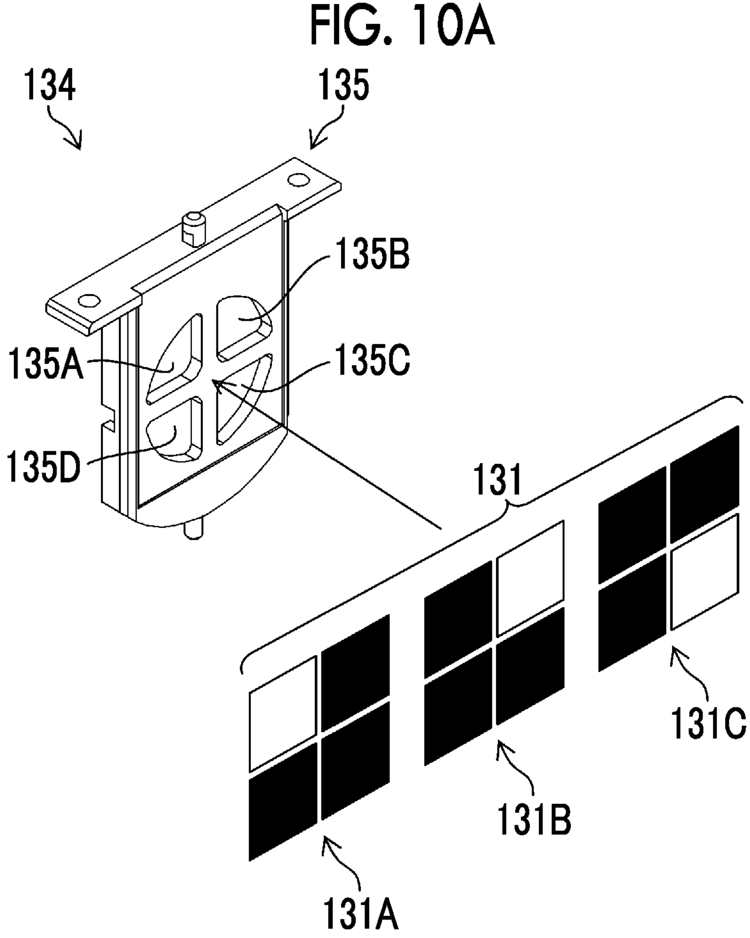
FIGS. 10A and 10B are diagrams showing an aspect in which some aperture regions are shielded by a light shielding member and the other aperture region is open.
Figure 10B:
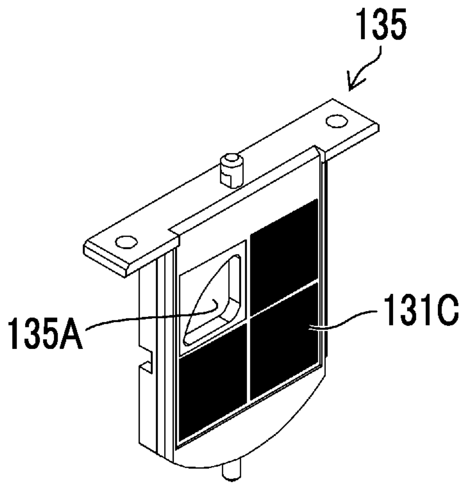

FIGS. 10A and 10B are diagrams showing an aspect in which some of the aperture regions are shielded by a light shielding member 131 and the rest of the aperture regions is open. Specifically, as shown in FIG. 10A, a light shielding member 131A corresponding to the aperture region 135A is disposed on a subject side of the frame 135 to shield the aperture regions other than the aperture region 135A, a light shielding member 131B corresponding to the aperture region 135B is disposed on the subject side of the frame 135 to shield the aperture regions other than the aperture region 135B, and a light shielding member 131C corresponding to the aperture region 135C is disposed on the subject side of the frame 135 to shield the aperture regions other than the aperture region 135C. FIG. 10B shows an aspect in which the aperture region 135A is open via the light shielding member 131A.

It is preferable that a member (on which an influence caused by transmission is in an allowable range in terms of the accuracy of interference removal) not transmitting light (light having a wavelength range to be used for the acquisition of an image) at all or not substantially transmitting the light is used as the light shielding member 131.

Further, filter sets 137A to 137C (the color filters and the polarizing filters) are disposed on a side of the frame 135 facing the imaging device body 200 (see FIG. 6). Specifically, the color filter 138A in which transmitted light has a wavelength range λ1 and the polarizing filter 139A having a polarization angle of 0 deg are disposed in the aperture region 135A, the color filter 138B in which transmitted light has a wavelength range λ2 and the polarizing filter 139B having a polarization angle of 45 deg are disposed in the aperture region 135B, and the color filter 138C in which transmitted light has a wavelength range λ3 and the polarizing filter 139C having a polarization angle of 90 deg are disposed in the aperture region 135C.

Figure 11A:
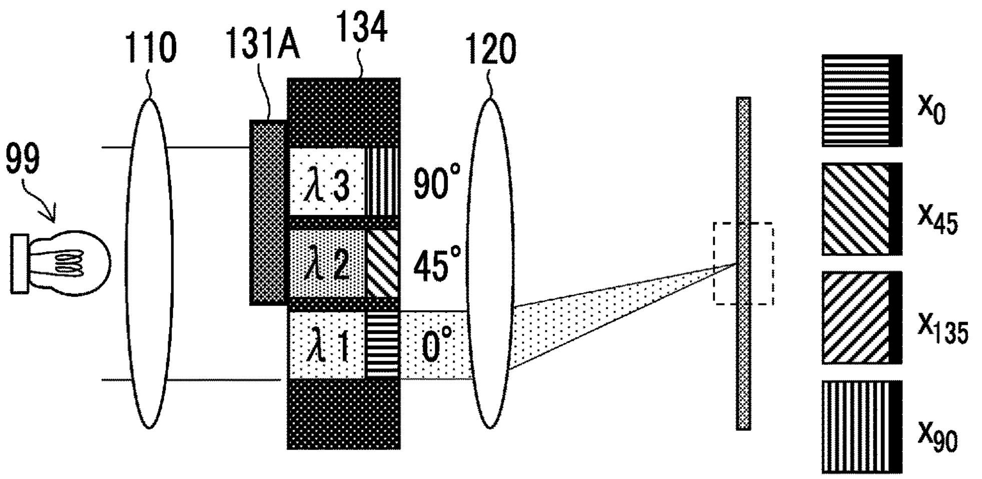
FIGS. 11A, 11B, and 11C are diagrams showing aspects of preliminary imaging for acquiring interference removal parameters.
Figure 11B:
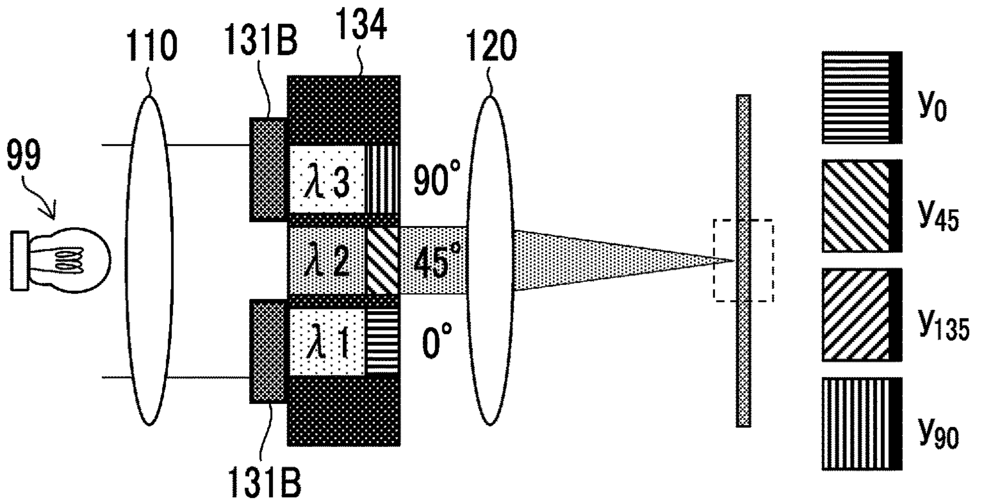
Figure 11C:
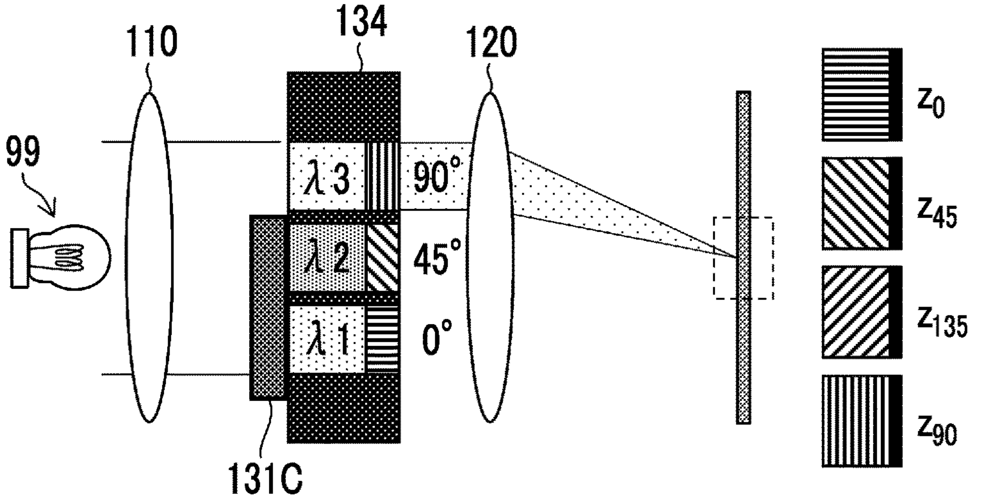

FIGS. 11A, 11B, and 11C are diagrams showing aspects of the preliminary imaging (first imaging) for acquiring interference removal parameters in the first aspect. FIG. 11A shows a state where the aperture region 135A transmitting light having a wavelength range λ1 (a polarization angle of 0 deg) is open and the rest of the aperture regions are shielded by the light shielding member 131A.

The imaging control unit 232 (processor) controls the readout of image signals output from the image sensor 210 (image sensor) in response to an imaging instruction operation input to the operation device 320 (a shutter button and the like), and acquires the image signals output via imaging as information that indicates the wavelength characteristics of the light source 99 (subject) (an information acquisition step, information acquisition processing). It is assumed that the wavelength characteristics of the light source 99 are already known. "Examples of the subject of which the wavelength characteristics are already known" include white paper, a color chart, and the like.

Image signals output from four types of pixels (pixels corresponding to the polarizing filter elements 214A to 214D) of the image sensor 210 in this state are denoted by x0, x45, x135, and x90.

Likewise, FIG. 11B shows a state where the aperture region 135B transmitting light having a wavelength range 22 (a polarization angle of 45 deg) is open and the rest of the aperture regions are shielded by the light shielding member 131B. Image signals output from the image sensor 210 in this state are denoted by y0, y45, y135, and y90. A step (processing) in which the imaging control unit 232 acquires these image signals is the information acquisition step (information acquisition processing). Further, FIG. 11C shows a state where the aperture region 135C transmitting light having a wavelength range 23 (a polarization angle of 90 deg) is open and the rest of the aperture regions are shielded by the light shielding member 131C. Image signals output from the image sensor 210 in this state are denoted by z0, z45, z135, and z90. A step in which the imaging control unit 232 acquires these image signals is also the information acquisition step.

In the first aspect and each of the following aspects (including a modification example), the opening of the aperture region (the acquisition of image signals) does not need to be performed in order of the aperture regions 135A to 135C.

In this way, the imaging control unit 232 (processor) acquires four image signals (a plurality of image signals; first image signals) corresponding to each of the lights (the plurality of lights) having the wavelength ranges λ1, λ2, and λ3 as information that indicates the wavelength characteristics of the light source 99 (subject) (an information acquisition step, information acquisition processing).

A case where one of three aperture regions (aperture regions 135A to 135C) is open and the remaining two aperture regions are shielded has been described in the above-mentioned example. However, in a case where interference removal parameters are acquired using the present invention, the number of aperture regions to be shielded is not limited to two and at least one aperture region may be shielded.

Figure 12:
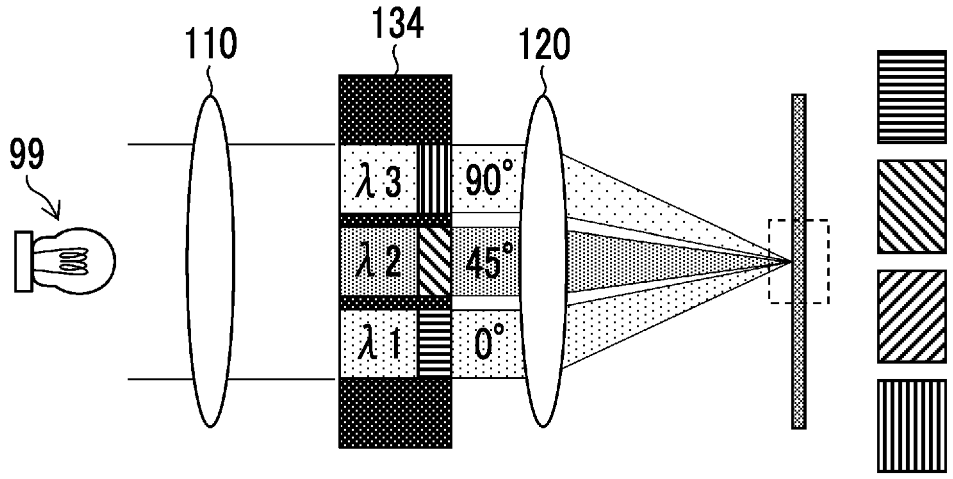
FIG. 12 is a diagram showing an aspect of main imaging in a first aspect.

FIG. 12 is a diagram showing an aspect of the main imaging (second imaging) in the first aspect. In the main imaging, the imaging control unit 232 (processor) acquires image signals in a state where the light shielding member is not disposed.

[Calculation Example of Interference Removal Parameter in First Aspect]

[Regarding First Aperture Region]

In a case where the intensity (already known) of light having passed through a first aperture region (referred to as the aperture region 135A) is denoted by Iλ1 and an interference removal matrix (a matrix formed of interference removal parameters) is referred to as an "interference removal matrix A", the following (Determinant 1) is satisfied.

$$A\begin{pmatrix} x_0 \\ x_{45} \\ x_{135} \\ x_{90} \end{pmatrix} = \begin{pmatrix} I_{\lambda 1} \\ 0 \\ 0 \end{pmatrix} \qquad \text{(Determinant 1)}$$

Components of a matrix (x0, x45, x135, x90)$_T$—of a left side are sensor intensities of the image sensor 210 (first image signals that are a plurality of image signals corresponding to a plurality of lights) at pixels corresponding to polarization angles of 0 deg, 45 deg, 135 deg, and 90 deg, respectively, and components of a matrix (Iλ1, 0, 0)$^T$ of a right side are the intensities of lights that are transmitted through the filter unit 134 and have wavelength ranges λ1, λ2, and λ3, respectively. (Determinant 1) means "In a case where interference is removed from sensor output intensities at the time of opening only the first aperture region, the intensity of a light having a wavelength range λ1 should be Iλ1 and the intensities of lights having the other wavelength ranges λ2 and λ3 should be 0". In the following description, the matrix (x0, x45, x135, x90)$^T$ of the left side may be referred to as a "matrix X".

[Regarding Second Aperture Region]

As in the case of the first aperture region, in a case where the intensity (already known) of light having passed through a second aperture region (referred to as the aperture region 135B) is denoted by Iλ2 and an interference removal matrix (a matrix formed of interference removal parameters) is referred to as an "interference removal matrix A", the following (Determinant 2) is satisfied.

$$A\begin{pmatrix} y_0 \\ y_{45} \\ y_{135} \\ y_{90} \end{pmatrix} = \begin{pmatrix} 0 \\ I_{\lambda 2} \\ 0 \end{pmatrix} \quad \text{(Determinant 2)}$$

Components of a matrix (y0, y45, y135, y90)$^T$ of a left side are sensor intensities of the image sensor 210 (first image signals that are a plurality of image signals corresponding to a plurality of lights) at pixels corresponding to polarization angles of 0 deg, 45 deg, 135 deg, and 90 deg, respectively, and components of a matrix (0, Iλ2, 0)$^T$ of a right side are the intensities of lights that are transmitted through the filter unit 134 and have wavelength ranges λ1, λ2, and λ3, respectively. (Determinant 2) means "In a case where interference is removed from sensor output intensities at the time of opening only the second aperture region, the intensity of a light having a wavelength range λ2 should be Iλ2 and the intensities of lights having the other wavelength ranges λ1 and λ3 should be 0". In the following description, the matrix (y0, y45, y135, y90)$^T$ of the left side may be referred to as a "matrix Y".

[Regarding Third Aperture Region]

As in the cases of the first and second aperture regions, in a case where the intensity (already known) of light having passed through a third aperture region (referred to as the aperture region 135C) is denoted by Iλ3 and an interference removal matrix (a matrix formed of interference removal parameters) is referred to as an "interference removal matrix A", the following (Determinant 3) is satisfied.

$$A\begin{pmatrix} z_0 \\ z_{45} \\ z_{135} \\ z_{90} \end{pmatrix} = \begin{pmatrix} 0 \\ 0 \\ I_{\lambda 3} \end{pmatrix} \quad \text{(Determinant 3)}$$

Components of a matrix (z0, z45, z135, z90)$^T$ of a left side are sensor intensities of the image sensor 210 (first image signals that are a plurality of image signals corresponding to a plurality of lights) at pixels corresponding to polarization angles of 0 deg, 45 deg, 135 deg, and 90 deg, respectively, and components of a matrix (0, 0, Iλ3)$^T$ of a right side are the intensities of lights that are transmitted through the filter unit 134 and have wavelength ranges λ1, λ2, and λ3, respectively. (Determinant 3) means "In a case where interference is removed from sensor output intensities at the time of opening only the third aperture region, the intensity of a light having a wavelength range λ3 should be Iλ3 and the intensities of lights having the other wavelength ranges λ1 and λ2 should be 0". In the following description, the matrix (z0, z45, z135, z90)$^T$ of the left side may be referred to as a "matrix Z".

The parameter acquisition unit 236 (processor) acquires second interference removal parameters to be used for the interference removal of second image signals (a plurality of image signals in second imaging (main imaging)) on the basis of (Determinant 1) to (Determinant 3) described above (with reference to the first image signals acquired with regard to the first to third aperture regions (information indicating the wavelength characteristics of the subject)) (a second parameter acquisition step, second parameter acquisition processing).

In a case where (Determinant 1) to (Determinant 3) are combined, (Determinant 1) to (Determinant 3) can be described as the following (Determinant 4).

$$A\begin{pmatrix} x_0 & y_0 & z_0 \\ x_{45} & y_{45} & z_{45} \\ x_{135} & y_{135} & z_{135} \\ x_{90} & y_{90} & z_{90} \end{pmatrix} = \begin{pmatrix} I_{\lambda 1} & 0 & 0 \\ 0 & I_{\lambda 2} & 0 \\ 0 & 0 & I_{\lambda 3} \end{pmatrix} \quad \text{(Determinant 4)}$$

In a case where a second matrix (a matrix formed of the matrices X, Y, and Z) of a left side is referred to as a "matrix B" and a pseudo inverse matrix thereof is referred to as a "matrix B$^{-1}$", the parameter acquisition unit 236 acquires second interference removal parameters (interference removal matrix A) with the following (Determinant 5) using a formula of the pseudo inverse matrix (a second parameter acquisition step, second parameter acquisition processing).

$$A = \begin{pmatrix} I_{\lambda 1} & 0 & 0 \\ 0 & I_{\lambda 2} & 0 \\ 0 & 0 & I_{\lambda 3} \end{pmatrix} B^{-1} = \begin{pmatrix} I_{\lambda 1} & 0 & 0 \\ 0 & I_{\lambda 2} & 0 \\ 0 & 0 & I_{\lambda 3} \end{pmatrix} (B^{*}B)^{-1}B^{*} \quad \text{(Determinant 5)}$$

Numerical Example (Part 1) in First Aspect

[Regarding First Aperture Region]

Assuming that an output of the image sensor 210 in a case where white paper (a subject of which the wavelength characteristics are already known) is subjected to the preliminary imaging (first imaging) in a state where the aperture regions other than the first aperture region (referred to as the aperture region 135A) are shielded by the light shielding member 131A as shown in FIG. 11A is a matrix (x0, x45, x135, x90)$^T$=(1, 0.5, 0.5, 0)$^T$, the following (Determinant 6) is satisfied with regard to the first aperture region. The light source 99 is the white paper, and it is assumed that "the intensity (already known) of light having passed through the first aperture region=1" (all of the intensities of the lights having the wavelength ranges λ1 to λ3 are 1).

$$A\begin{pmatrix}1\\0.5\\0.5\\0\end{pmatrix}=\begin{pmatrix}1\\0\\0\end{pmatrix}\qquad\text{(Determinant 6)}$$

(Determinant 6) means "In a case where interference is removed from sensor output intensities at the time of opening only the first aperture region, the intensity of a light having a wavelength range λ1 should be 1 and the intensities of lights having the other wavelength ranges λ2 and λ3 should be 0".

[Regarding Second Aperture Region]

As in the first aperture region, assuming that an output of the image sensor 210 in a case where white paper (a subject of which the wavelength characteristics are already known) is subjected to the preliminary imaging (first imaging) in a state where the aperture regions other than the second aperture region (referred to as the aperture region 135B) are shielded by the light shielding member 131B as shown in FIG. 11B is a matrix $(y0, y45, y135, y90)^T=(0.5, 1.0, 0.0, 0.5)^T$, the following (Determinant 7) is satisfied with regard to the second aperture region. The light source 99 is the white paper, and it is assumed that "the intensity (already known) of light having passed through the second aperture region=1" (all of the intensities of the lights having the wavelength ranges λ1 to λ3 are 1).

$$A\begin{pmatrix}0.5\\1.0\\0.0\\0.5\end{pmatrix}=\begin{pmatrix}0\\1\\0\end{pmatrix}\qquad\text{(Determinant 7)}$$

(Determinant 7) means "In a case where interference is removed from sensor output intensities at the time of opening only the second aperture region, the intensity of a light having a wavelength range λ2 should be 1 and the intensities of lights having the other wavelength ranges λ1 and λ3 should be 0".

[Regarding Third Aperture Region]

As in the first and second aperture regions, assuming that an output of the image sensor 210 in a case where white paper (a subject of which the wavelength characteristics are already known) is subjected to the preliminary imaging (first imaging) in a state where the aperture regions other than the third aperture region (referred to as the aperture region 135C) are shielded by the light shielding member 131C as shown in FIG. 11C is a matrix $(z0, z45, z135, z90)^T=(0.0, 0.5, 0.5, 1.0)^T$, the following (Determinant 8) is satisfied with regard to the third aperture region. The light source 99 is the white paper, and it is assumed that "the intensity (already known) of light having passed through the third aperture region=1" (all of the intensities of the lights having the wavelength ranges λ1 to λ3 are 1).

$$A\begin{pmatrix}0.0\\0.5\\0.5\\1.0\end{pmatrix}=\begin{pmatrix}0\\0\\1\end{pmatrix}\qquad\text{(Determinant 8)}$$

(Determinant 8) means "In a case where interference is removed from sensor output intensities at the time of opening only the third aperture region, the intensity of a light having a wavelength range λ3 should be 1 and the intensities of lights having the other wavelength ranges λ1 and λ2 should be 0".

In a case where (Determinant 6) to (Determinant 8) described above are combined, the following (Determinant 9) is satisfied.

$$A\begin{pmatrix}1&0.5&0.0\\0.5&1.0&0.5\\0.5&0.0&0.5\\0.0&0.5&1.0\end{pmatrix}=\begin{pmatrix}1&0&0\\0&1&0\\0&0&1\end{pmatrix}\qquad\text{(Determinant 9)}$$

In a case where a right matrix of a left side of (Determinant 9) is referred to as a "matrix B" and a pseudo inverse matrix thereof is referred to as a "matrix $B^{-1}$", the parameter acquisition unit 236 acquires second interference removal parameters (interference removal matrix A) with the following (Determinant 10) (a second parameter acquisition step, second parameter acquisition processing).

$$\text{(Determinant 10)}$$

$$A=\begin{pmatrix}1&0&0\\0&1&0\\0&0&1\end{pmatrix}B^{-1}=$$

$$(B^*B)^{-1}B^*=\left(\begin{pmatrix}1&0.5&0.5&0.0\\0.5&1.0&0.0&0.5\\0.0&0.5&0.5&1.0\end{pmatrix}\begin{pmatrix}1.0&0.5&0.0\\0.5&1.0&0.5\\0.5&0.0&0.5\\0.0&0.5&1.0\end{pmatrix}\right)^{-1}$$

$$\begin{pmatrix}1.0&0.5&0.5&0.0\\0.5&1.0&0.0&0.5\\0.0&0.5&0.5&1.0\end{pmatrix}=$$

$$\left(\begin{pmatrix}1.5&1.0&0.5\\1.0&1.5&1.0\\0.5&1.0&1.5\end{pmatrix}\right)^{-1}\begin{pmatrix}1.0&0.5&0.5&0.0\\0.5&1.0&0.0&0.5\\0.0&0.5&0.5&1.0\end{pmatrix}=$$

$$\begin{pmatrix}1.25&-1.0&0.25\\-1.0&2.0&-1.0\\0.25&-1.0&1.25\end{pmatrix}\begin{pmatrix}1.0&0.5&0.5&0.0\\0.5&1.0&0.0&0.5\\0.0&0.5&0.5&1.0\end{pmatrix}=$$

$$\begin{pmatrix}0.75&-0.25&0.75&-0.25\\0.0&1.0&-1.0&0.0\\-0.25&-0.25&0.75&0.75\end{pmatrix}$$

[Verification of Results for Numerical Example (Part 1)]

In a case where "(the intensities of lights having passed through the first to third aperture regions) in the actual imaging (second imaging)=(1, 2, 3)" is satisfied, an output of the image sensor 210 in an interference state (before interference removal) is (2, 4, 2, 4) at pixels corresponding to polarization angles of 0 deg, 45 deg, 135 deg, and 90 deg. A matrix $(1, 2, 3)^T$ is multiplied by a matrix formed of the outputs of the image sensor 210 obtained via three times of the preliminary imaging (first imaging) as in the following (Determinant 11), so that this output can be obtained.

$$\begin{pmatrix}1&0.5&0.0\\0.5&1.0&0.5\\0.5&0.0&0.5\\0.0&0.5&1.0\end{pmatrix}\begin{pmatrix}1\\2\\3\end{pmatrix}=\begin{pmatrix}2\\4\\2\\4\end{pmatrix}\qquad\text{(Determinant 11)}$$

In a case where interference is to be removed from this output, the interference removal unit 238 (processor) performs interference removal as in the following (Determinant 12) (an interference removal step, interference removal processing).

$$A\begin{pmatrix}2\\4\\2\\4\end{pmatrix}=\begin{pmatrix}0.75 & -0.25 & 0.75 & -0.25\\0.0 & 1.0 & -1.0 & 0.0\\-0.25 & -0.25 & 0.75 & 0.75\end{pmatrix}\begin{pmatrix}2\\4\\2\\4\end{pmatrix}=\begin{pmatrix}1\\2\\3\end{pmatrix} \quad \text{(Determinant 12)}$$

As apparent from (Determinant 12), interference removal can be correctly performed by the above-mentioned processing (the first/second parameter acquisition steps, the first/second parameter acquisition processing, the information acquisition step, the information acquisition processing, the interference removal step, and the interference removal processing) such that (the intensities of lights having passed through the first to third aperture regions) are (1, 2, 3). That is, a difference between the information (the first image signals, information indicating the wavelength characteristics of the subject) acquired via the first imaging and the second image signals from which interference is removed using the second interference removal parameters is smaller than a difference between the information acquired via the first imaging and the second image signals from which interference is removed using the first interference removal parameters. Specifically, the interference removal matrix is determined in (Determinant 6) to (Determinant 8) such that a difference between results (image signals from which interference has been removed) obtained in a case where the interference removal matrix A of the left side is multiplied by the output of the image sensor 210 and the information (acquired information) about the subject on the right side of Determinant is small (the difference is zero in the above-mentioned example).

[Output of Image Signal]

The display control unit 240 (processor) can cause the display device 300 (output device) to display an image (a plurality of image signals) corresponding to the image signals from which interference has been removed (the image signals (1, 2, 3) in the above-mentioned example). Further, the recording control unit 242 (processor) can store the image (a plurality of image signals) corresponding to the image signals from which interference has been removed in the storage device 310 (output device).

Numerical Example (Part 2) in First Aspect

[Regarding First Aperture Region]

Assuming that an output of the image sensor 210 in a case where white paper (a subject of which the wavelength characteristics are already known) is imaged in a state where the aperture regions other than the first aperture region (referred to as the aperture region 135A) are shielded by the light shielding member 131A as shown in FIG. 11A is a matrix $(x0, x45, x135, x90)^T=(0.8, 0.4, 0.4, 0.2)^T$, the following (Determinant 13) is satisfied with regard to the first aperture region. The light source 99 is the white paper, and it is assumed that "the intensity (already known) of light having passed through the first aperture region=1" (all of the intensities of the lights having the wavelength ranges λ1 to λ3 are 1).

$$A\begin{pmatrix}0.8\\0.4\\0.4\\0.2\end{pmatrix}=\begin{pmatrix}1\\0\\0\end{pmatrix} \quad \text{(Determinant 13)}$$

(Determinant 13) means "In a case where interference is removed from sensor output intensities at the time of opening only the first aperture region, the intensity of a light having a wavelength range λ1 should be 1 and the intensities of lights having the other wavelength ranges λ2 and λ3 should be 0".

[Regarding Second Aperture Region]

As in the first aperture region, assuming that an output of the image sensor 210 in a case where white paper (a subject of which the wavelength characteristics are already known) is imaged in a state where the aperture regions other than the second aperture region (referred to as the aperture region 135B) are shielded by the light shielding member 131B as shown in FIG. 11B is a matrix $(y0, y45, y135, y90)^T=(0.3, 0.9, 0.1, 0.3)^T$, the following (Determinant 14) is satisfied with regard to the second aperture region. The light source 99 is the white paper, and it is assumed that "the intensity (already known) of light having passed through the second aperture region=1" (all of the intensities of the lights having the wavelength ranges λ1 to λ3 are 1).

$$A\begin{pmatrix}0.3\\0.9\\0.1\\0.3\end{pmatrix}=\begin{pmatrix}0\\1\\0\end{pmatrix} \quad \text{(Determinant 14)}$$

(Determinant 14) means "In a case where interference is removed from sensor output intensities at the time of opening only the second aperture region, the intensity of a light having a wavelength range λ2 should be 1 and the intensities of lights having the other wavelength ranges λ1 and λ3 should be 0".

[Regarding Third Aperture Region]

As in the first and second aperture regions, assuming that an output of the image sensor 210 in a case where white paper (a subject of which the wavelength characteristics are already known) is imaged in a state where the aperture regions other than the third aperture region (referred to as the aperture region 135C) are shielded by the light shielding member 131C as shown in FIG. 11C is a matrix $(z0, z45, z135, z90)^T=(0.0, 0.5, 0.5, 0.1)^T$, the following (Determinant 15) is satisfied with regard to the third aperture region. The light source 99 is the white paper, and it is assumed that "the intensity (already known) of light having passed through the third aperture region=1" (all of the intensities of the lights having the wavelength ranges λ1 to λ3 are 1).

$$A\begin{pmatrix}0.0\\0.5\\0.5\\1.0\end{pmatrix}=\begin{pmatrix}0\\0\\1\end{pmatrix} \quad \text{(Determinant 15)}$$

(Determinant 15) means "In a case where interference is removed from sensor output intensities at the time of opening only the third aperture region, the intensity of a light having a wavelength range λ3 should be 1 and the intensities of lights having the other wavelength ranges λ1 and λ2 should be 0".

In a case where (Determinant 13) to (Determinant 15) described above are combined, the following (Determinant 16) is satisfied.

$$A\begin{pmatrix}0.8&0.3&0.0\\0.4&0.9&0.5\\0.4&0.1&0.5\\0.2&0.3&1.0\end{pmatrix}=\begin{pmatrix}1&0&0\\0&1&0\\0&0&1\end{pmatrix} \quad \text{(Determinant 16)}$$

In a case where a right matrix of a left side of (Determinant 16) is referred to as a "matrix B" and a pseudo inverse matrix thereof is referred to as a "matrix $B^{-1}$", the parameter acquisition unit 236 acquires interference removal parameters (interference removal matrix A) with the following (Determinant 17) (a parameter acquisition step, parameter acquisition processing).

$$A=\begin{pmatrix}1&0&0\\0&1&0\\0&0&1\end{pmatrix}B^{-1}(B^{*}B)^{-1}B^{*}= \quad \text{(Determinant 17)}$$

$$\begin{pmatrix}1.183066&-0.43249&0.610984&-0.08924\\-0.26087&1.391304&-0.69565&-0.34783\\-0.3341&-0.2357&0.459954&0.887872\end{pmatrix}$$

Verification of Results for Numerical Example (Part 2)

In a case where "(the intensities of lights having passed through the first to third aperture regions) in the actual imaging (second imaging)=(1, 2, 3)" is satisfied, an output of the image sensor 210 in an interference state (before interference removal) is (1.4, 3.7, 2.1, 3.8) at pixels corresponding to polarization angles of 0 deg, 45 deg, 135 deg, and 90 deg. A matrix $(1, 2, 3)^T$ is multiplied by a matrix formed of the outputs of the image sensor obtained via three times of the preliminary imaging (first imaging) as in the following (Determinant 18), so that this output can be obtained.

$$\begin{pmatrix}0.8&0.3&0.0\\0.4&0.9&0.5\\0.4&0.1&0.5\\0.2&0.3&1.0\end{pmatrix}\begin{pmatrix}1\\2\\3\end{pmatrix}=\begin{pmatrix}1.4\\3.7\\2.1\\3.8\end{pmatrix} \quad \text{(Determinant 18)}$$

In a case where interference is to be removed from this output, the interference removal unit 238 (processor) performs interference removal as in the following (Determinant 19) (an interference removal step, interference removal processing).

$$A\begin{pmatrix}1.4\\3.7\\2.1\\3.8\end{pmatrix}= \quad \text{(Determinant 19)}$$

$$\begin{pmatrix}1.183066&-0.43249&0.610984&-0.08924\\-0.26087&1.391304&-0.69565&-0.34783\\-0.3341&-0.2357&0.459954&0.887872\end{pmatrix}\begin{pmatrix}1.4\\3.7\\2.1\\3.8\end{pmatrix}=$$

$$\begin{pmatrix}1\\2\\3\end{pmatrix}$$

As apparent from (Determinant 19), interference removal can be correctly performed by the above-mentioned processing such that (the intensities of lights having passed through the first to third aperture regions) are (1, 2, 3).

Modification Example of First Aspect

In the first aspect, the aperture regions other than a part of the aperture regions are shielded (shielded from light) using the light shielding member not transmitting light. However, the aperture regions may be shielded from light using polarizing filters (second polarizing members) of which the polarization directions (polarization angles) are orthogonal to the polarization directions of the polarizing filters disposed in the aperture regions. For example, a polarizing filter having a polarization angle of 90 deg can be disposed in the first aperture region (the aperture region 135A, the polarization angle of the polarizing filter 139 is 0 deg) to shield the aperture region from light. The same applies to the second and third aperture regions.

Second Aspect

Figure 13A:
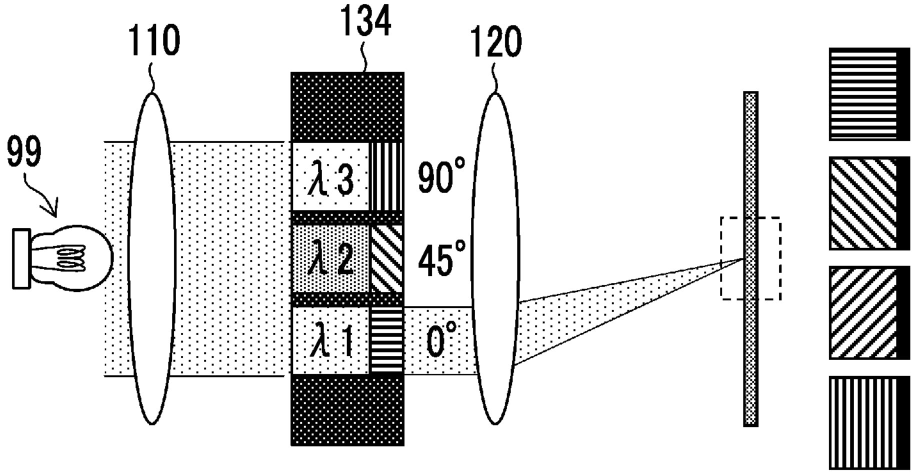
FIGS. 13A, 13B, and 13C are diagrams showing aspects in which shielding is optically performed with a change in the wavelength range of illumination light.
Figure 13B:
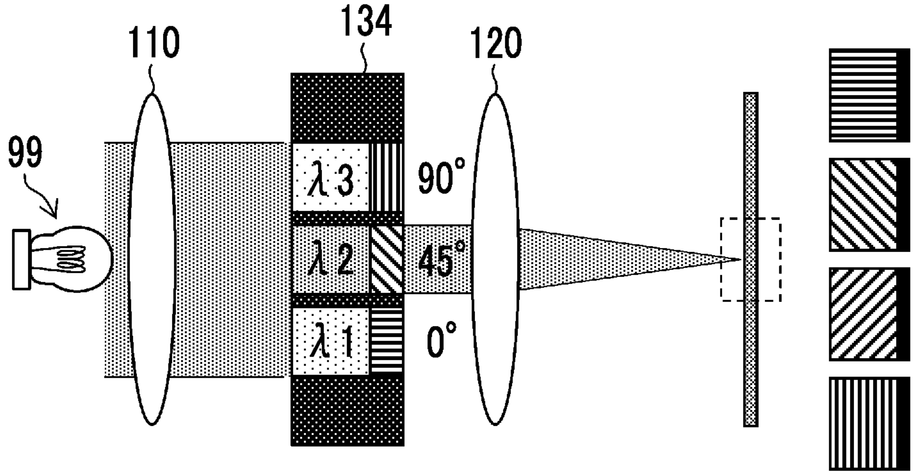
Figure 13C:
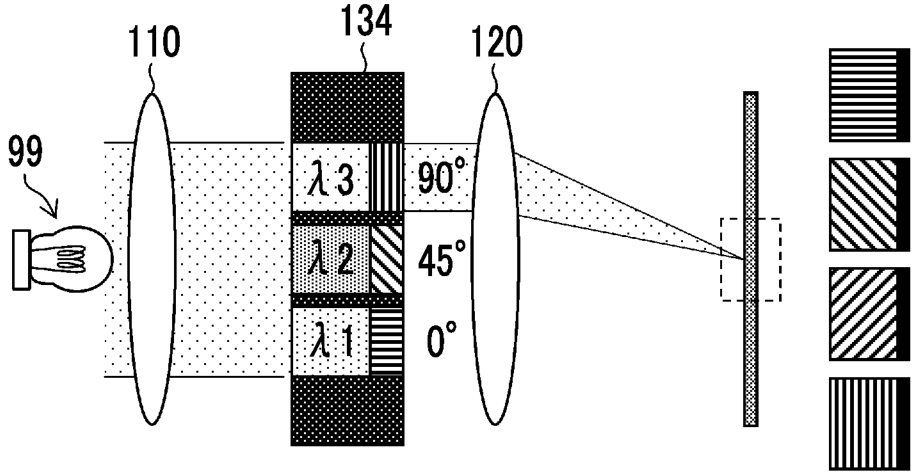

In a second aspect, the same light shielding member as in the first aspect is not used and shielding is optically performed with a change in the wavelength range of illumination light as shown in FIGS. 13A, 13B, and 13C. A subject of which the wavelength characteristics are already known is subjected to preliminary imaging in a state where shielding is optically performed. Specifically, as shown in FIG. 13A, in the first preliminary imaging, the subject is irradiated with light having a wavelength range that is transmitted through the first aperture region (here, the aperture region 135A in which the color filter 138A in which transmitted light has a wavelength range λ1 is disposed) and is not transmitted through the second and third aperture regions (the aperture region 135B in which the color filter 138B having a wavelength range λ2 is disposed and the aperture region 135C in which the color filter 138C having the wavelength range λ3 is disposed).

In the second preliminary imaging, as shown in FIG. 13B, the subject is irradiated with light having a wavelength range that is transmitted through the second aperture region (here, the aperture region 135B in which the color filter 138B in which transmitted light has a wavelength range λ2 is disposed) and is not transmitted through the first and third aperture regions (the aperture region 135A in which the color filter 138A having a wavelength range λ1 is disposed and the aperture region 135C in which the color filter 138C having the wavelength range λ3 is disposed).

Likewise, in the third preliminary imaging, as shown in FIG. 13C, the subject is irradiated with light having a wavelength range that is transmitted through the third aperture region (here, the aperture region 135C in which the color filter 138C in which transmitted light has a wavelength range λ3 is disposed) and is not transmitted through the first and second aperture regions (the aperture region 135A in which the color filter 138A having a wavelength range λ1 is disposed and the aperture region 135B in which the color filter 138B having the wavelength range λ2 is disposed).

Figure 14:
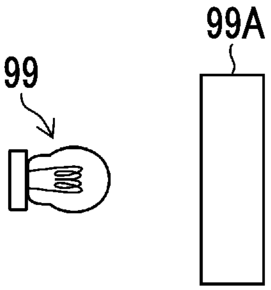
FIG. 14 is a diagram showing a state where a diffuser 99A is disposed in front of a light source 99.

A laser light source or a light-emitting diode (LED) light source that emits a monochromatic light having, for example, a red color, a green color, a blue color, or the like can be used for illumination in these types of preliminary imaging. As shown in FIG. 14, a diffuser 99A may be disposed in front of the light source 99 (between the light source 99 and the lens device 100) to uniformly disperse light from the light source. Further, light having a desired wavelength range may be extracted from light including a plurality of wavelength ranges using a device, such as a monochromator, or an optical element, such as a prism or a diffraction grating, and may be used for illumination in the preliminary imaging.

The imaging control unit 232, the image acquisition unit 234, and the parameter acquisition unit 236 (processor) can acquire interference removal parameters on the basis of information (the wavelength intensity of the subject), which indicates the wavelength characteristics of the subject and is acquired in the preliminary imaging, in the same manner as described in the first aspect even in the second aspect (an information acquisition step, information acquisition processing, a second parameter acquisition step, second parameter acquisition processing).

Third Aspect

Figure 15A:
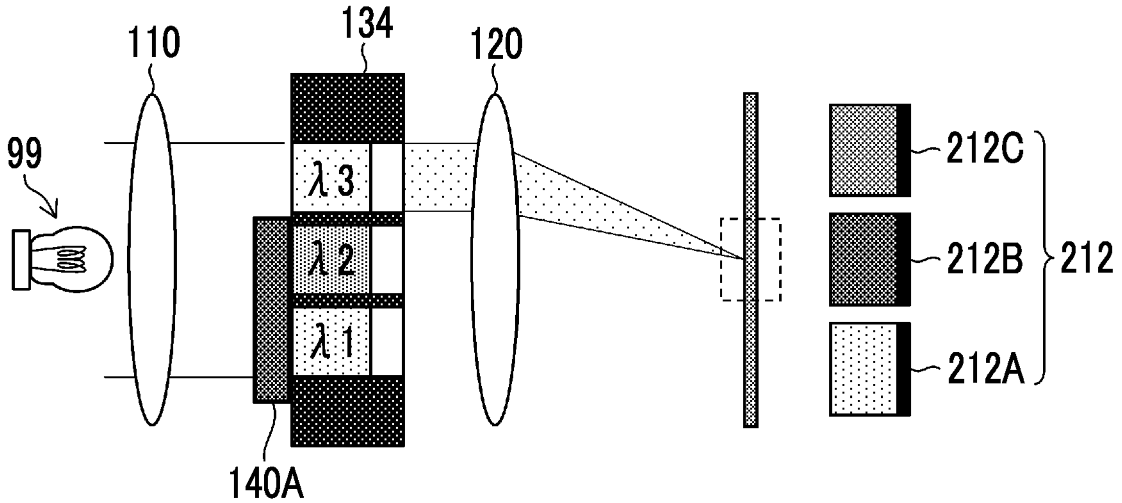
FIGS. 15A, 15B, and 15C are diagrams showing aspects of preliminary imaging in a third aspect.
Figure 15B:
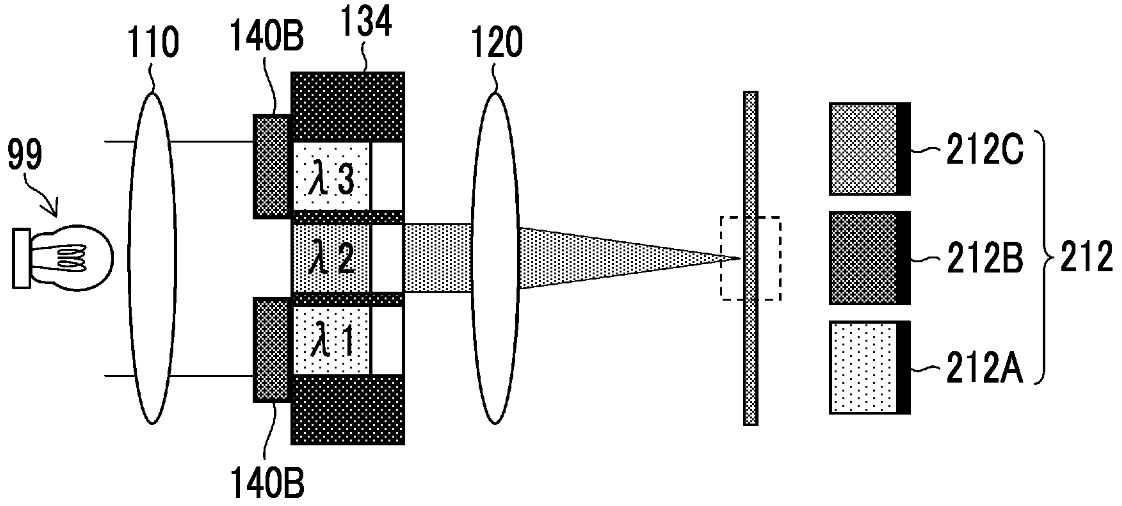
Figure 15C:
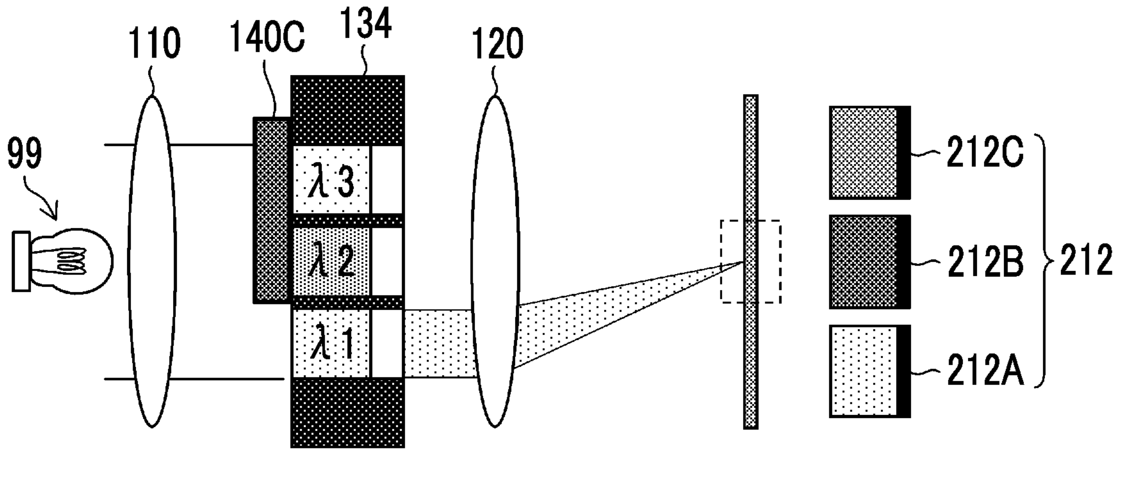

In the first and second aspects described above, the polarizing filters are disposed in the aperture regions and the image sensor 210 comprising the polarizing filter element-array layer 213 is used. In contrast, a third aspect is an aspect in which imaging is performed by a color sensor without the use of polarizing filters. FIGS. 15A, 15B, and 15C are diagrams showing aspects of preliminary imaging (first imaging) in the third aspect. As shown in FIGS. 15A, 15B, and 15C, color filters are disposed on the filter unit 134A but polarizing filters are not disposed thereon. Further, an image sensor 210A not includes a polarizing filter element-array layer, and comprises color filters 212A to 212C that have transmission wavelength ranges corresponding to the transmission wavelength ranges of the color filters 138A to 138C (sec FIG. 6) of the filter unit 134A, respectively. These color filters 212A to 212C form a color filter-array layer 212.

[Preliminary Imaging in Third Aspect]

The image acquisition unit 234 (processor) acquires image signals corresponding to lights having wavelength ranges λ1 to λ3 (a plurality of image signals corresponding to a plurality of lights) as "information indicating the wavelength characteristics of the subject" in a state where the aperture regions 135A and 135B are shielded by a light shielding member 140A and the aperture region 135C is open as shown in FIG. 15A, that is, in a state where only a light having the wavelength range λ3 is transmitted through the filter unit 134 (an information acquisition step, information acquisition processing). Further, the image acquisition unit 234 acquires image signals corresponding to lights having wavelength ranges λ1 to λ3 (a plurality of image signals corresponding to a plurality of lights) as "information indicating the wavelength characteristics of the subject" in a state where the aperture regions 135A and 135C are shielded by a light shielding member 140B and the aperture region 135B is open as shown in FIG. 15B, that is, in a state where only a light having the wavelength range λ2 is transmitted through the filter unit 134 (an information acquisition step, information acquisition processing). Furthermore, the image acquisition unit 234 acquires image signals corresponding to lights having wavelength ranges λ1 to λ3 (a plurality of image signals corresponding to a plurality of lights) as "information indicating the wavelength characteristics of the subject" in a state where the aperture regions 135B and 135C are shielded by a light shielding member 140C and the aperture region 135A is open as shown in FIG. 15C, that is, in a state where only a light having the wavelength range λ1 is transmitted through the filter unit 134 (an information acquisition step, information acquisition processing).

The parameter acquisition unit 236 (processor) can acquire interference removal parameters in the same manner as described above for the first and second aspects (a parameter acquisition step, parameter acquisition processing), and the interference removal unit 238 (processor) can perform interference removal using the acquired interference removal parameters (interference removal processing, an interference removal step).

Figure 16:
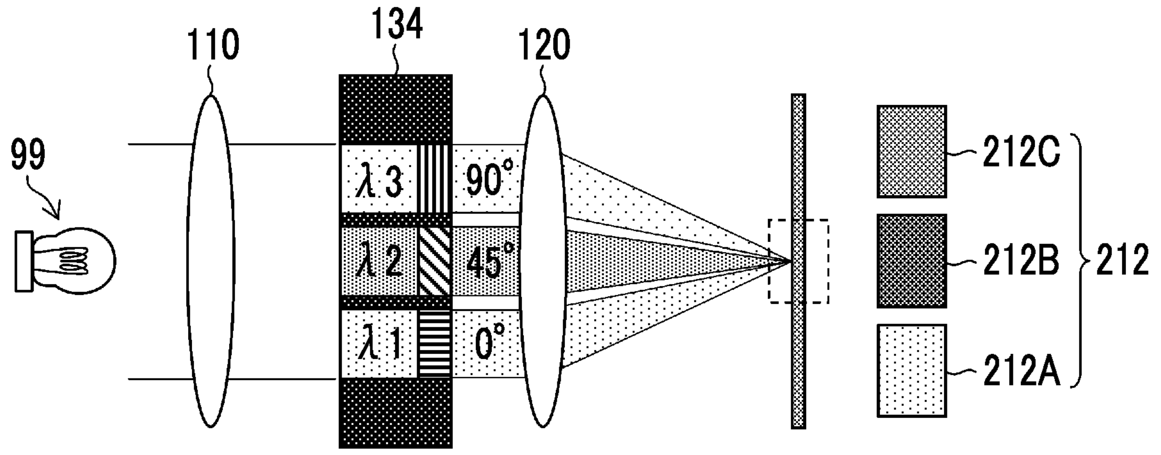
FIG. 16 is a diagram showing an aspect of actual imaging in the third aspect.

FIG. 16 is a diagram showing an aspect of actual imaging (second imaging) in the third aspect. As shown in FIG. 16, imaging is performed in the actual imaging without the use of the light shielding members 140A to 140C.

Fourth Aspect

Figure 17A:
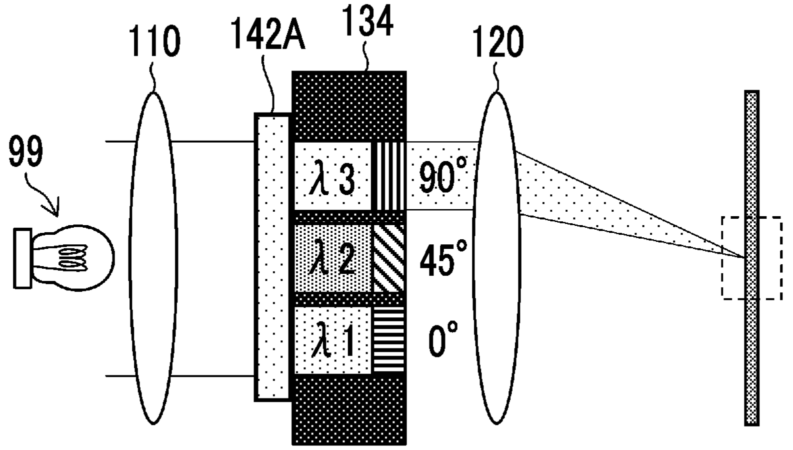
FIGS. 17A, 17B, and 17C are diagrams showing aspects in which color filters are disposed closer to a subject than the filter unit.
Figure 17B:
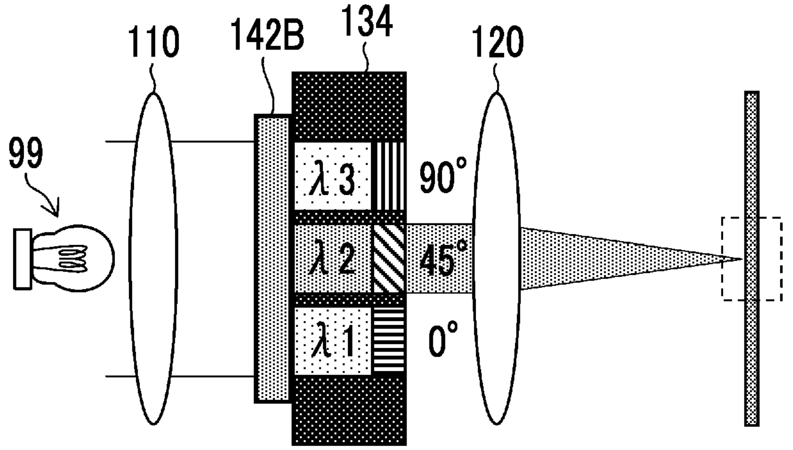
Figure 17C:
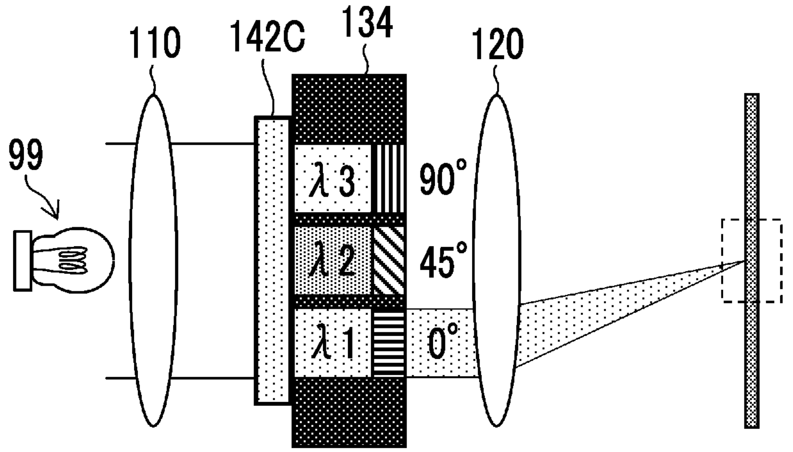

In a fourth aspect, color filters 138A to 138C disposed in the aperture regions 135A to 135C and each of color filters (wavelength range-selecting filters) having transmission wavelength ranges are disposed closer to the subject (light source) than the filter unit 134 and a subject of which the wavelength characteristics are already known is subjected to the preliminary imaging (first imaging). FIGS. 17A to 17C are diagrams showing aspects in which color filters 142A to 142C in which the wavelength ranges of transmitted lights are Δ3, λ2, and λ1 are disposed closer to the subject than the filter unit 134.

Figure 18:
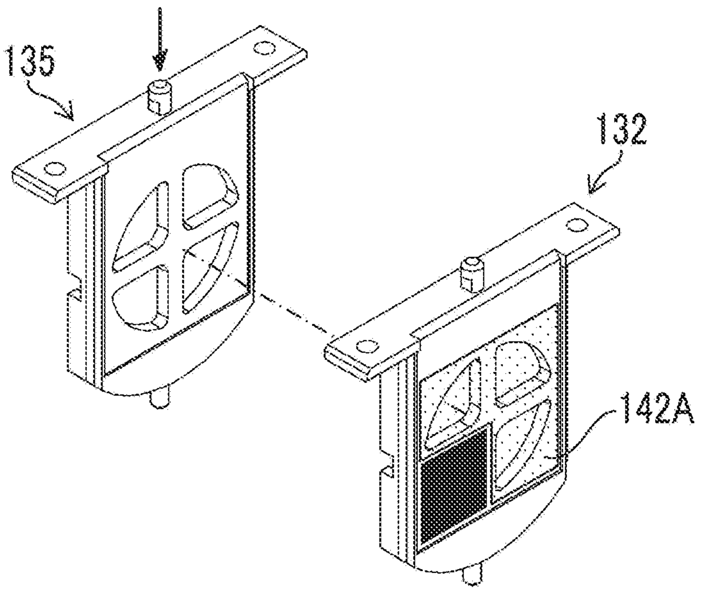
FIG. 18 is a diagram showing an aspect in which the color filter is mounted on another frame and inserted closer to the subject than the filter unit.
Figure 19:
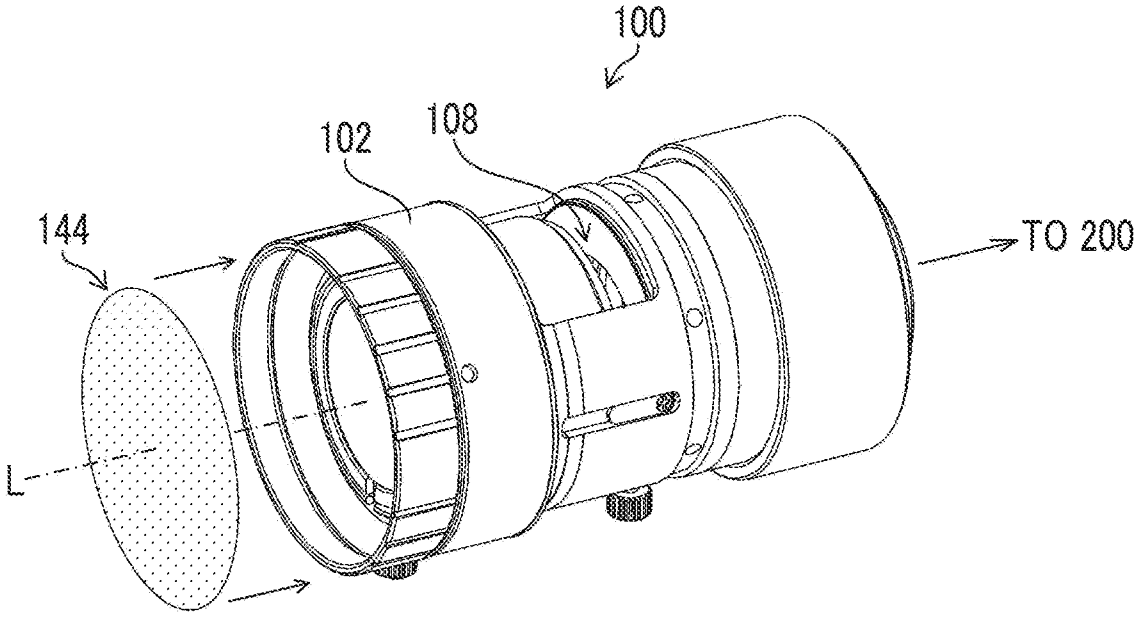
FIG. 19 is a diagram showing an aspect in which a color filter is mounted closer to the subject than a first lens.

In a case where the color filter is disposed "closer to the subject than the filter unit 134", the color filter is not directly mounted on the filter unit 134 unlike in the examples shown in FIGS. 17A, 17B, and 17C and each of the color filters 142A to 142C is separately mounted on a frame 132 separate from the frame 135 and may be inserted closer to the subject than the filter unit 134 as shown in FIG. 18. Further, as shown in FIG. 19, a color filter 144 may be mounted closer to the subject (on a side of the lens device 100 closest to the subject in FIG. 19) than the first lens 110 and may be replaced.

Fifth Aspect

Figure 20A:
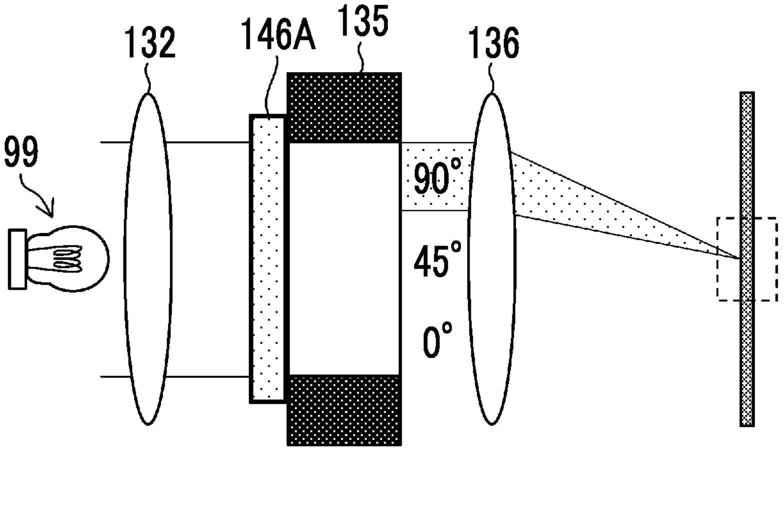
FIGS. 20A, 20B, and 20C are diagrams showing aspects in which color filters are disposed closer to the subject than the frame.
Figure 20B:
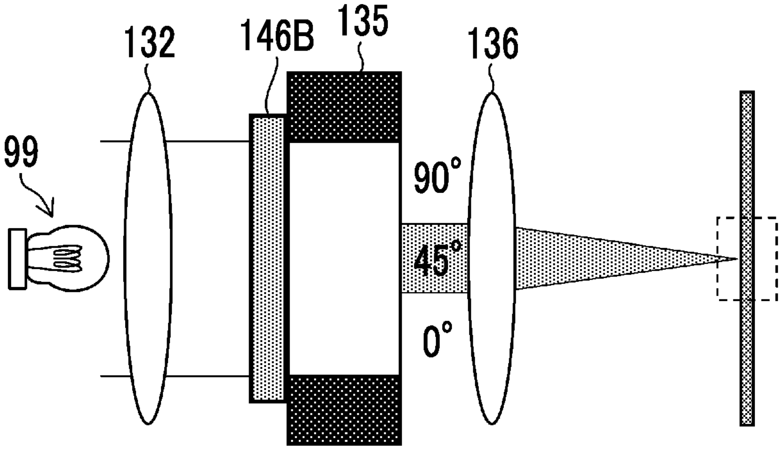
Figure 20C:
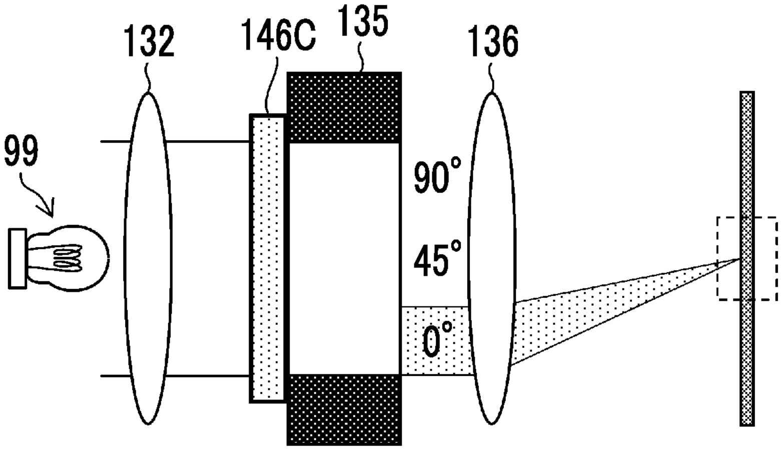

In a fifth aspect, each of color filters (wavelength-selecting filters) having the same transmission wavelength ranges as the color filters 138A to 138C is disposed closer to the subject than the frame 135 in a state where the color filters 138A to 138C are not mounted on the frame 135 or in a state where the filter unit 134 is not inserted into the slit 108. That is, the color filter is disposed closer to the subject than the color filters 138A to 138C in a case where the color filters 138A to 138C are mounted on the frame 135. Alternatively, the color filter is disposed closer to the subject than the frame 135 in a case where the filter unit 134 (frame 135) is inserted into the slit 108. The image acquisition unit 234 (processor) acquires image signals (first information), which correspond to a subject of which the wavelength characteristics are unknown, via the preliminary imaging (first imaging) in this state (an information acquisition step, information acquisition processing). FIGS. 20A to 20C are diagrams showing aspects in which color filters 146A to 146C in which the wavelength ranges of transmitted lights are λ3, λ2, and λ1 are disposed closer to the subject than the frame 135, and the image acquisition unit 234 acquires first image signals in the state shown in each of FIGS. 20A to 20C.

Further, the image acquisition unit 234 acquires image signals (second information), which correspond to a subject of which the wavelength characteristics are unknown, in the same manner as described above with reference to FIGS. 11A, 11B, and 11C or FIGS. 17A, 17B, and 17C in a state where the color filters 138A to 138C are mounted on the frame 135 or in a state where the filter unit 134 is inserted into the slit 108 (an information acquisition step, information acquisition processing).

The parameter acquisition unit 236 (processor) acquires parameters, which are used to correct the second information, as interference removal parameters on the basis of the first information (a parameter acquisition step, parameter acquisition processing). The interference removal unit 238 (processor) can perform interference removal using the acquired interference removal parameters (an interference removal step, interference removal processing). According to the fifth aspect, it is possible to acquire interference removal parameters having high accuracy even in the case of a subject of which the wavelength characteristics are unknown.

Although the embodiment and the modification example of the present invention have been described above, the present invention is not limited to the aspect described above, and various modifications can be made without departing from the scope of the present invention.

EXPLANATION OF REFERENCES

10: imaging system
99: light source
99A: diffuser
100: lens device
102: lens barrel
104: first lever
106: second lever
108: slit
110: first lens
120: second lens
131: light shielding member
131A: light shielding member
131B: light shielding member
131C: light shielding member
132: frame
133: frame
133A: aperture region
133B: aperture region
133C: aperture region
134: filter unit
134A: filter unit
135: frame
135A: aperture region
135B: aperture region
135C: aperture region
135D: aperture region
135E: light shielding member
135G: centroid
137: filter set
137A: filter set
137B: filter set
137C: filter set
137D: filter set
138: image sensor
138A: color filter
138B: color filter
138C: color filter
138D: color filter
139: polarizing filter
139A: polarizing filter
139B: polarizing filter
139C: polarizing filter
139D: polarizing filter
140A: light shielding member
140B: light shielding member
140C: light shielding member
142A: color filter
142B: color filter
142C: color filter
144: color filter
146A: color filter
146B: color filter
146C: color filter
200: imaging device body
210: image sensor
210A: image sensor
211: pixel array layer
211A: photodiode
212: color filter-array layer
212A: color filter
212B: color filter
212C: color filter
213: polarizing filter element-array layer
214A: polarizing filter element
214B: polarizing filter element
214C: polarizing filter element
214D: polarizing filter element
215: microlens array layer
216: microlens
230: processor
232: imaging control unit
234: image acquisition unit
236: parameter acquisition unit
238: interference removal unit
240: display control unit
242: recording control unit
244: flash memory
246: RAM
300: display device
310: storage device
320: operation device
L: optical axis
X: matrix
Y: matrix
Z: matrix
λ1: wavelength range
λ2: wavelength range
λ3: wavelength range

What is claimed is:

1. An information processing method that is performed by an information processing apparatus including a processor and acquires interference removal parameters for a pupil split type multispectral camera, wherein the pupil split type multispectral camera includes a plurality of aperture regions that are disposed at a pupil position or near a pupil, a plurality of optical filters that are disposed in the plurality of aperture regions and transmit a plurality of lights of which at least a part of wavelength ranges are different from each other, and an image sensor that outputs a plurality of image signals corresponding to the plurality of lights, the processor is configured to perform a first parameter acquisition step of acquiring first interference removal parameters to be used for interference removal of the plurality of image signals, an information acquisition step of acquiring first image signals, which are the plurality of image signals corresponding to the plurality of lights, as information indicating wavelength characteristics of a subject via first imaging, and a second parameter acquisition step of acquiring second interference removal parameters to be used for interference removal of second image signals, which are a plurality of image signals obtained via second imaging, with reference to the information acquired via the first imaging, in the second parameter acquisition step, the processor is configured to acquire the second interference removal parameters, which allow a difference between the information acquired via the first imaging and the second image signals from which interference is removed using the second interference removal parameters to be smaller than a difference between the information acquired via the first imaging and the second image signals from which interference is removed using the first interference removal parameters, in the information acquisition step, the processor is configured to:

acquire the information about a subject of which wavelength characteristics are unknown as first information by imaging the subject in a state where the plurality of optical filters are not disposed in the plurality of aperture regions and a color filter transmitting one of the plurality of lights and not transmitting a rest of the lights is disposed closer to the subject than the plurality of optical filters; and acquire the information about the subject of which wavelength characteristics are unknown as second information by imaging the subject in a state where the plurality of optical filters are disposed in the plurality of aperture regions and a color filter transmitting one of the plurality of lights and not transmitting a rest of the lights is disposed closer to the subject than the plurality of optical filters, and in the second parameter acquisition step, the processor is configured to:

remove interference from the second image signals using the first interference removal parameters;

remove interference from the second image signals using the second interference removal parameters; and acquire parameters, which are used to correct the second information, as the second interference removal parameters on the basis of the first information.

2. The information processing method according to claim 1, wherein the first imaging is preliminary imaging and the second imaging is main imaging, and a focusing position of the first imaging is equivalent to a focusing position of the second imaging.

3. The information processing method according to claim 1, wherein the processor is configured to acquire a wavelength intensity of the subject in a state where light is not transmitted through a part of the plurality of aperture regions, in the information acquisition step.

4. The information processing method according to claim 1, wherein the processor is configured to acquire the first image signals, which are output in a case where a subject of which wavelength characteristics are already known is imaged in a state where a part of the plurality of aperture regions are shielded and a rest of the aperture regions are open, as the information, in the information acquisition step.

5. The information processing method according to claim 4, wherein the processor is configured to acquire the first image signals as the information in a state where a light shielding member not transmitting light is disposed in the part of the aperture regions to physically shield the part of the aperture regions, in the information acquisition step.

6. The information processing method according to claim 4, wherein the pupil split type multispectral camera includes a plurality of first polarizing members that are disposed in the plurality of aperture regions and transmit lights having different polarization angles, and the processor is configured to acquire the first image signals as the information in a state where second polarizing members having polarization angles orthogonal to polarization angles of the first polarizing members disposed in the part of the aperture regions are disposed in the part of the aperture regions to optically shield the part of the aperture regions, in the information acquisition step.

7. The information processing method according to claim 4, wherein the processor is configured to acquire the first image signals by imaging the subject of which wavelength characteristics are already known in a state where a color filter transmitting one of the plurality of lights and not transmitting a rest of the lights is disposed close to the subject than the plurality of optical filters, in the information acquisition step.

8. The information processing method according to claim 1, wherein the pupil split type multispectral camera includes a plurality of first polarizing members that are disposed in the plurality of aperture regions and transmit lights having different polarization angles, and a plurality of second polarizing members that are disposed on the image sensor and transmit lights having polarization angles corresponding to polarization angles of the plurality of first polarizing members, and the processor is configured to acquire a plurality of image signals corresponding to the polarization angles of the plurality of first polarizing members as the information, in the information acquisition step.

9. A non-transitory, computer-readable tangible recording medium on which a program for causing an information processing apparatus having a processor, to execute the information processing method according to claim 1 is recorded.

10. An information processing apparatus that acquires interference removal parameters for a pupil split type multispectral camera including a plurality of aperture regions disposed at a pupil position or near a pupil, a plurality of optical filters disposed in the plurality of aperture regions and transmitting a plurality of lights of which at least a part of wavelength ranges are different from each other, and an image sensor outputting a plurality of image signals corresponding to the plurality of lights, the information processing apparatus comprising:

a processor, wherein the processor is configured to perform first parameter acquisition processing of acquiring first interference removal parameters to be used for interference removal of the plurality of image signals, information acquisition processing of acquiring the plurality of image signals corresponding to the plurality of lights as information indicating wavelength characteristics of a subject via first imaging, and second parameter acquisition processing of acquiring second interference removal parameters to be used for interference removal of second image signals, which are a plurality of image signals obtained via second imaging, with reference to the information acquired via the first imaging, and the processor is configured to acquire the second interference removal parameters, which allow a difference between the information acquired via the first imaging and the second image signals from which interference is removed using the second interference removal parameters to be smaller than a difference between the information acquired via the first imaging and the second image signals from which interference is removed using the first interference removal parameters, in the second parameter acquisition processing, in the information acquisition processing, the processor is configured to:

acquire the information about a subject of which wavelength characteristics are unknown as first information by imaging the subject in a state where the plurality of optical filters are not disposed in the plurality of aperture regions and a color filter transmitting one of the plurality of lights and not transmitting a rest of the lights is disposed closer to the subject than the plurality of optical filters; and acquire the information about the subject of which wavelength characteristics are unknown as second information by imaging the subject in a state where the plurality of optical filters are disposed in the plurality of aperture regions and a color filter transmitting one of the plurality of lights and not transmitting a rest of the lights is disposed closer to the subject than the plurality of optical filters, and in the second parameter acquisition processing, the processor is configured to:

remove interference from the second image signals using the first interference removal parameters;

remove interference from the second image signals using the second interference removal parameters; and acquire parameters, which are used to correct the second information, as the second interference removal parameters on the basis of the first information.

11. An information processing system comprising:

a pupil split type multispectral camera including a plurality of aperture regions that are disposed at a pupil position or near a pupil, a plurality of optical filters disposed in the plurality of aperture regions and transmitting a plurality of lights of which at least a part of wavelength ranges are different from each other, and an image sensor that outputs a plurality of image signals corresponding to the plurality of lights; and the information processing apparatus according to claim 10.

12. The information processing system according to claim 11, wherein the processor is configured to:

remove interference from the second image signals using the second interference removal parameters; and cause an output device to output the plurality of second image signals from which the interference has been removed.

* * * * *